(12) United States Patent
Ching et al.

(10) Patent No.: US 12,499,340 B2
(45) Date of Patent: Dec. 16, 2025

(54) METHODS AND SYSTEMS FOR OPERATING A PRINTING APPARATUS

(71) Applicant: Hand Held Products, Inc., Charlotte, NC (US)

(72) Inventors: Sze Ping Ching, Singapore (SG); Phek Thong Lee, Singapore (SG); Cheng Khoon Ng, Singapore (SG); Suraini Binte Saptu, Singapore (SG)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 18/751,624

(22) Filed: Jun. 24, 2024

(65) Prior Publication Data
US 2024/0346273 A1    Oct. 17, 2024

Related U.S. Application Data

(60) Continuation of application No. 18/333,868, filed on Jun. 13, 2023, now Pat. No. 12,056,546, which is a continuation of application No. 17/664,768, filed on May 24, 2022, now Pat. No. 11,720,770, which is a division of application No. 16/906,359, filed on Jun. 19, 2020, now Pat. No. 11,373,071.

(51) Int. Cl.
*G06K 15/02* (2006.01)
*G06F 3/12* (2006.01)

(52) U.S. Cl.
CPC ..... *G06K 15/1843* (2013.01); *G06K 15/1817* (2013.01); *G06K 15/1822* (2013.01)

(58) Field of Classification Search
None
See application file for complete search history.

(56) References Cited

U.S. PATENT DOCUMENTS

| | | | |
|---|---|---|---|
| 4,571,699 A | 2/1986 | Herzog et al. | |
| 4,948,955 A | 8/1990 | Lee et al. | |
| 5,122,973 A * | 6/1992 | Venner ................. | G06K 15/02 358/1.18 |
| 6,002,844 A | 12/1999 | Kishida et al. | |

(Continued)

FOREIGN PATENT DOCUMENTS

| | | | | |
|---|---|---|---|---|
| JP | H0924654 | * | 1/1997 | ............ B41J 21/00 |
| JP | 2004070960 | * | 3/2004 | ............ G06F 17/00 |

(Continued)

OTHER PUBLICATIONS

Decision to grant a European patent Mailed on Dec. 12, 2024 for EP Application No. 21180478, 2 page(s).

(Continued)

*Primary Examiner* — Beniyam Menberu
(74) *Attorney, Agent, or Firm* — Alston & Bird LLP

(57) ABSTRACT

Various embodiments illustrated herein disclose a method comprising rendering a buffer image from a first image data received for printing. Further, the method includes scaling the buffer image to generated scaled buffer image. Furthermore, the method includes determining a first location of a machine readable indicia in the scaled buffer image. Additionally, the method includes causing a print head to print the buffer image on a print media to generate a printed content.

20 Claims, 15 Drawing Sheets

(56) References Cited

U.S. PATENT DOCUMENTS

| | | | | |
|---|---|---|---|---|
| 6,064,763 | A | * | 5/2000 | Maltsev ............... G06K 7/1478 |
| | | | | 382/199 |
| 6,419,340 | B1 | | 7/2002 | Wickham et al. |
| 6,429,951 | B1 | * | 8/2002 | Kiuchi ............. G06K 19/06037 |
| | | | | 382/256 |
| 11,373,071 | B2 | | 6/2022 | Ching et al. |
| 11,720,770 | B2 | * | 8/2023 | Ching ................. G06K 15/1843 |
| | | | | 358/1.2 |
| 12,056,546 | B2 | | 8/2024 | Ching et al. |
| 2001/0024291 | A1 | | 9/2001 | Mori et al. |
| 2002/0044689 | A1 | | 4/2002 | Roustaei et al. |
| 2003/0133139 | A1 | * | 7/2003 | Robinson ........... H04N 1/32133 |
| | | | | 358/1.18 |
| 2005/0052700 | A1 | * | 3/2005 | Mackenzie ......... G06F 3/03545 |
| | | | | 358/1.18 |
| 2007/0144373 | A1 | | 6/2007 | Okura et al. |
| 2012/0182374 | A1 | | 7/2012 | Matsuda et al. |
| 2012/0218540 | A1 | | 8/2012 | Ishimi et al. |
| 2012/0293840 | A1 | | 11/2012 | Wilson |
| 2013/0076848 | A1 | | 3/2013 | Nobushima et al. |
| 2013/0194621 | A1 | | 8/2013 | Sweet et al. |
| 2019/0116275 | A1 | | 4/2019 | Edwards et al. |

FOREIGN PATENT DOCUMENTS

| | | | | |
|---|---|---|---|---|
| JP | 2005-012690 | A | | 1/2005 |
| JP | 2005-026808 | A | | 1/2005 |
| JP | 2006130820 | | * | 5/2006 ............. B41J 3/407 |
| JP | 2015-102574 | A | | 6/2015 |
| KR | 20030084405 | | * | 11/2003 ............... H04N 1/41 |

OTHER PUBLICATIONS

Chun-Shun Tseng, Kai-Tse Wang, Ming-Chang Wu, Nai-Yuan Cheng and Jung-Hua Wang, "Retrospective tracking for barcode reading," 2010 8th IEEE International Conference on Industrial Informatics, 2010, pp. 114-119, doi: 10.1109/INDIN.2010.5549451. (Year: 2010).

Examiner Interview Summary Record (PTOL-413) Mailed on Dec. 22, 2022 for U.S. Appl. No. 17/664,768, 2 page(s).
Examiner Interview Summary Record (PTOL-413) Mailed on Feb. 25, 2022 for U.S. Appl. No. 16/906,359.
Examiner Interview Summary Record (PTOL-413) Mailed on Mar. 13, 2024 for U.S. Appl. No. 18/333,868, 2 page(s).
Extended European search report and written opinion Mailed on Nov. 22, 2021 for EP Application No. 21180478, 8 pages.
Intention to grant Mailed on Aug. 13, 2024 for EP Application No. 21180478, 9 page(s).
Non-Final Office Action received for U.S. Appl. No. 16/906,359, mailed on Aug. 18, 2021, 19 pages.
Non-Final Rejection Mailed on Dec. 7, 2023 for U.S. Appl. No. 18/333,868, 30 page(s).
Non-Final Rejection Mailed on Sep. 15, 2022 for U.S. Appl. No. 17/664,768.
Notice of Allowance and Fees Due (PTOL-85) Mailed on Mar. 13, 2023 for U.S. Appl. No. 17/664,768.
Notice of Allowance and Fees Due (PTOL-85) Mailed on Mar. 25, 2024 for U.S. Appl. No. 18/333,868, 11 page (s).
Notice of Allowance received for U.S. Appl. No. 16/906,359, mailed on Feb. 25, 2022, 17 pages.
Notice of Allowance received for U.S. Appl. No. 16/906,359, mailed on May 20, 2022, 3 pages.
Office Action Appendix Mailed on Dec. 22, 2022 for U.S. Appl. No. 17/664,768, 1 page(s).
Office Action Appendix Mailed on Dec. 22, 2022 for U.S. Appl. No. 17/664,768, 2 page(s).
Office Action Appendix Mailed on Feb. 25, 2022 for U.S. Appl. No. 16/906,359.
Office Action Appendix Mailed on Mar. 13, 2024 for U.S. Appl. No. 18/333,868, 1 page(s).
Office Action Appendix Mailed on Mar. 13, 2024 for U.S. Appl. No. 18/333,868, 2 page(s).
Extended European Search Report Mailed on Feb. 21, 2025 for EP Application No. 24213326, 8 page(s).
Communication about intention to grant a European patent Mailed on Sep. 17, 2025 for EP Application No. 24213326, 6 page(s).

* cited by examiner

METHODS AND SYSTEMS FOR OPERATING A PRINTING APPARATUS

CROSS-REFERENCE TO RELATED APPLICATIONS

This application is a continuation of and claims priority to U.S. application Ser. No. 18/333,868, entitled "METHODS AND SYSTEMS FOR OPERATING A PRINTING APPARATUS" and filed Jun. 13, 2023, which is a continuation of and claims priority to U.S. application Ser. No. 17/664,768, now U.S. Pat. No. 11,720,770, filed May 24, 2022, which is a divisional of U.S. application Ser. No. 16/906,359, now U.S. Pat. No. 11,373,071, filed Jun. 19, 2020, the entirety of which is hereby incorporated by reference.

TECHNICAL FIELD

Example embodiments of the present disclosure relate generally to a printing apparatus and, more particularly, to systems and methods for operating the printing apparatus.

BACKGROUND

A typical printing apparatus may include a print head that may be configured to print content on print media. The printing apparatus may further include a verifier that may be configured to evaluate a quality of the printed content. For example, to perform the verification operation, the verifier may first scan the printed content (e.g., capture an image of the printed content). Thereafter, the printing apparatus may be configured to evaluate the quality of the printed content based on the quality of the image of the printed content.

BRIEF SUMMARY

Various embodiments illustrated herein disclose a method comprising rendering a buffer image from a first image data received for printing. Further, the method includes scaling the buffer image to generated scaled buffer image. Furthermore, the method includes determining a first location of a machine readable indicia in the scaled buffer image. Additionally, the method includes causing a print head to print the buffer image on a print media to generate a printed content.

Various embodiments illustrated herein disclose a method for operating a user computing device. The method includes receiving an input from a user pertaining to printing a first image. Further, the method includes determining a first location of a machine readable indicia in the first image. Furthermore, the method includes converting to a bit stream. Additionally, the method includes transmitting an instruction to a printing apparatus to print the first image, wherein the instruction includes the bit stream, and the first location of the machine readable indicia.

Various embodiments illustrated herein disclose a printing apparatus that includes a print head configured to print a buffer image on print media to generate a printed content, an image capturing unit configured to capture a second image of a portion of the printed content, and a processor communicatively coupled to the print head and the image capturing unit. The processor is configured to scale the buffer image to generated scaled buffer image. Further, the processor is configured to determine a first location of a machine readable indicia in the scaled buffer image. Furthermore, the processor is configured to determine a second location of the machine readable indicia in the printed content based on the first location of the machine readable indicia in the scaled buffer image. Additionally, the processor is configured to cause the image capturing unit to capture the second image of the portion of the printed content based on the second location of the machine readable indicia.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF THE INVENTION

Figure 1:
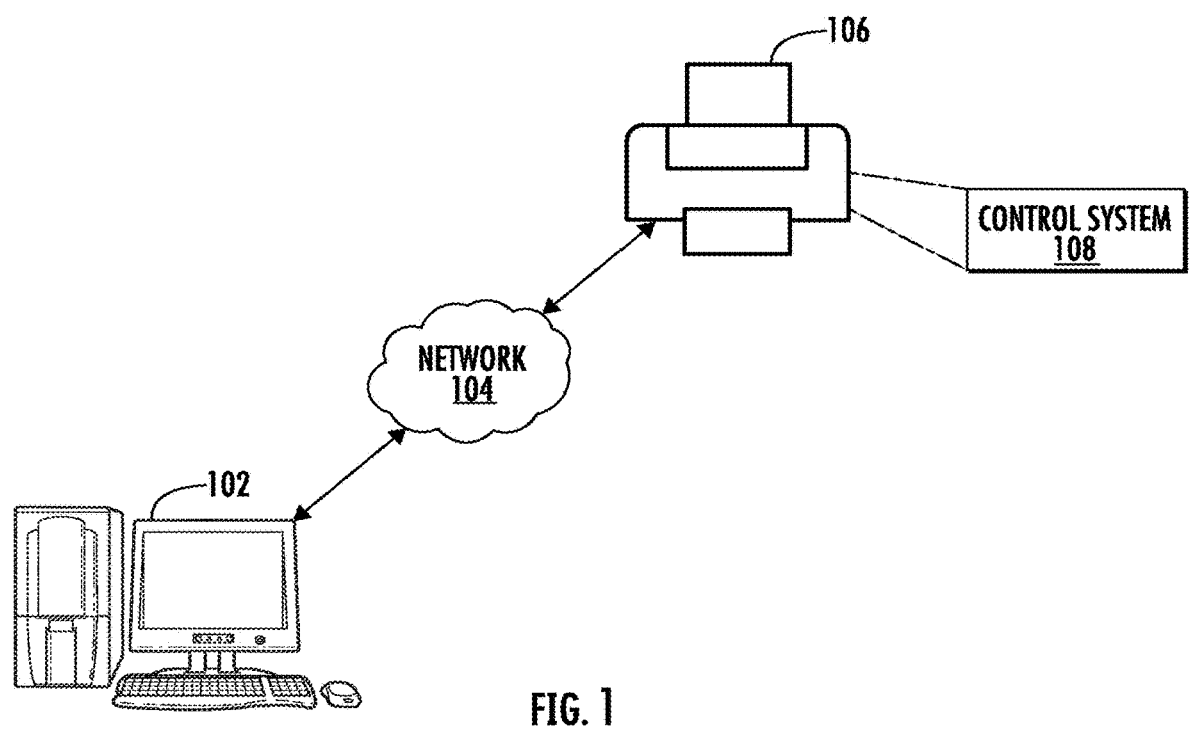
FIG. 1 illustrates a system environment where various embodiments of the disclosure may be implemented.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, one or more particular features, structures, or characteristics from one or more embodiments may be combined in any suitable manner in one or more other embodiments.

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

The term "electronically coupled," "electronically coupling," "electronically couple," "in communication with," "in electronic communication with," or "connected" in the present disclosure refers to two or more components being connected (directly or indirectly) through wired means (for example but not limited to, system bus, wired Ethernet) and/or wireless means (for example but not limited to, Wi-Fi, Bluetooth, ZigBee), such that data and/or information may be transmitted to and/or received from these components.

The terms "print media," "physical print media," "paper," and "labels" refer to tangible, substantially durable physical material onto which text, graphics, images and/or the like may be imprinted and persistently retained over time. Physical print media may be used for personal communications, business communications, and/or the like to convey prose expression (including news, editorials, product data, academic writings, memos, and many other kinds of communications), data, advertising, fiction, entertainment content, and illustrations and pictures. Physical print media may be generally derivatives of wood pulp or polymers, and includes conventional office paper, clear or tinted acetate media, news print, envelopes, mailing labels, product labels, and other kinds of labels. Thicker materials, such as cardstock or cardboard may be included as well. In exemplary embodiments discussed throughout this document, reference may be made specifically to "paper" or "labels;" however, the operations, system elements, and methods of such exemplary applications may be applicable to media other than or in addition to the specifically mentioned "paper" or "labels.". In some embodiments, the print media may correspond to a continuous media that may be loaded in a printing apparatus in form of a roll or a stack, or may correspond to media that may be divided into a plurality of labels through perforations defined along a width of the print media. Alternatively or additionally, the print media may be divided into the plurality of labels through one or more marks that are defined at a predetermined distance from each other, along the length of the print media. In some example embodiments, a contiguous stretch of the print media, between two consecutive marks or two consecutive perforations, corresponds to a label of the print media.

The terms "printer" and "printing apparatus" refer to a device that may imprint texts, images, shapes, symbols, graphics such as barcodes, and/or the like onto print media to create a persistent, human-viewable representation of the corresponding texts, images, shapes, symbols, graphics, and/or the like. Printers may include, for example, laser printers, thermal printers, ink-jet printers, and/or the like.

The term "machine readable indicia" has been broadly intended to include any indicia, including Linear symbols, 2D barcodes (such as QR code, and Datamatrix codes), RFID tags, IR tags, near-field-communication (NFC) tags, and characters that are readable by a computing device (for example, an indicia scanner). Indicia are typically graphical representations of information (e.g., data), such as product numbers, package tracking numbers, patient identification numbers, medication tracking identifiers, personnel identification numbers, etc.

The term "quality" may refer to standard or protocol based on which content may be evaluated or compared with each other. For example, quality of printed content may be evaluated based on resolution of the printed content, degree of conformity, print density, contrast with print media and/or the like. In some examples, the quality of the printed content may be further evaluated based on the quality of certain portions of the printed content. For example, the quality of the printed content may be evaluated based on quality of machine readable indicia in the printed content. To this end, the quality of the machine readable indicia may be evaluated based on ANSI X3.182, ISO15415, and ISO/IEC 15416 standards. The process of the evaluating the quality of the machine readable indicia is also referred to as grading the machine readable indicia.

The term "location" may refer to a point or a single coordinate in an image. In some examples, the location in an image may be represented in one or more coordinate systems such as, but not limited Cartesian coordinate system, Polar coordinate system, and/or the like.

A typical printing apparatus may include a verifier that may be utilized to evaluate a quality of printed content. For example, the verifier may be utilized to evaluate the quality of a machine readable indicia in the printed content. In some examples, the verifier may scan the printed content to generate an image of the printed content. Further, the verifier may transmit the image of the printed content to a processor of the printing apparatus. The processor may identify and retrieve the machine readable indicia from the image of the printed content. Thereafter, the processor may evaluate the quality of the machine readable indicia in the image of the printed content. Since the image of the printed content is a digital representation of the printed content, therefore, the quality of the machine readable indicia in the image of the printed content may be indicative of the quality of the machine readable indicia in the printed content (i.e., the print quality of the machine readable indicia). In some examples, identifying and retrieving the machine readable indicia directly from the image of the printed content is usually computationally intensive and may affect the overall efficiency of the printing apparatus.

Systems and methods described herein disclose a printing apparatus that may receive a first image data that includes information pertaining to the first image, which is to be printed. In some examples, the printing apparatus may receive the first image data in form of a bit stream. In some examples, the first image data may be representative of the first image. The printing apparatus may render a buffer image from the bit stream (included in the first image data). In an example embodiment, the buffer image may be a representation of the first image. Additionally or alternately, the printing apparatus may scale the buffer image to generate a scaled buffer image. In some examples, scaling the buffer image may involve modifying a resolution of the buffer image. For example, the printing apparatus may reduce the resolution of the buffer image during scaling of the buffer image. Concurrently, in some examples, the printing apparatus may print the buffer image on the print media to generate printed content.

In some examples, the printing apparatus may identify a region of interest in the scaled buffer image. For example, the printing apparatus may identify a machine readable indicia in the scaled buffer image as the region of interest. Identifying the machine readable indicia in the scaled buffer image may include identifying one or more first locations in the buffered image. In some examples, identifying the one or more first locations in the scaled buffer image may include determining coordinates of the one or more first locations in the scaled buffer image. In an example embodiment, the one or more first locations may encompass the machine readable indicia in the scaled buffer image. More particularly, the one or more first locations may define a periphery of the machine readable indicia in the scaled buffer image. Using the one or more first locations (which encompasses the machine readable indicia in the buffered image), the printing apparatus may be configured to determine one or more second locations on the printed content, which encompass the machine readable indicia in the printed content. In some examples, the one or more second locations encompassing the machine readable indicia in the printed content may be different from the one or more first locations encompassing the machine readable indicia in the scaled buffer image. Such difference in the locations may be due to the difference in the resolution of the printed content and the scaled buffer image. Accordingly, the printing apparatus may determine the one or more second locations on the printed content based on at least the resolution of the scaled buffer image.

In some examples, the printing apparatus may cause the verifier (in the printing apparatus) to scan the printed content. In an example embodiment, scanning the printed content causes the verifier to generate a second image of the printed content. From the second image, the printing apparatus may retrieve a portion of the second image based on the one or more second locations. In an example embodiment, the one or more second locations may define a periphery of the portion of the second image. Since the one or more second locations encompass the machine readable indicia in the printed content and the second image is a digital representation of the printed content therefore, the portion of the second image (encompassed by the one or more second locations in the second image) may include the machine readable indicia. Thereafter, the printing apparatus may evaluate the quality of the machine readable indicia in portion of the second image. The quality of the machine readable indicia in the portion of the second image is reflective of the print quality of the machine readable indicia in the printed content.

Additionally or alternatively, the printing apparatus may cause the verifier (in the printing apparatus) to scan a portion of the printed content to generate the second image. For example, the printing apparatus may cause the verifier to only scan the portion of the printed image that is encompassed by the one or more second locations in the printed content. As discussed, the one or more second locations encompass the machine readable indicia. Accordingly, the second image may only include the machine readable indicia. Thereafter, the printing apparatus may evaluate the quality of the machine readable indicia in the second image. The quality of the machine readable indicia in the second image is reflective of the print quality of the machine readable indicia in the printed content.

Since the one or more second locations, used to retrieve the region of interest from the printed content, are determined by utilizing the scaled buffer image, therefore, the computational resources required to identify and retrieve the region of interest directly from the printed content are saved. Thus, proposed methods and systems for operating the printing apparatus improves the overall efficiency of the printing apparatus.

FIG. 1 illustrates a system environment 100 where various embodiments of the disclosure may be implemented. The system environment 100 includes a user computing device 102, a network 104, and a printing apparatus 106. Further, the printing apparatus 106 includes a control unit 108. The user computing device 102 and the printing apparatus 106 are communicatively coupled with each other through the network 104.

In an example embodiment, the user computing device 102 may refer to a computing device used by a user of the printing apparatus 106. The user computing device 102 may comprise one or more processors and one or more memories. The one or more memories may include computer readable code that may be executable by the one or more processors to perform predetermined operations. Further, the user computing device 102 may include one or more interfaces that may facilitate communication with the printing apparatus 106 through the network 104. In an example embodiment, the user computing device 102 may be configured to receive an input from the user 110 to generate a print job. In an example embodiment, the print job may include data (e.g., first image data) to be printed by the printing apparatus 106. Some examples of the data may include text and/or graphics to be printed by the printing apparatus 106. After generation of the print job, the user computing device 102 may be configured to transmit an instruction (comprising the print job) to the printing apparatus 106 for performing the print operation. The structure of the user computing device 102 and the operation of the user computing device 102 have been described in conjunction with FIGS. 13 and 14, respectively. Examples of the user computing device 102 may include, but are not limited to, a personal computer, a laptop, a personal digital assistant (PDA), a mobile device, a tablet, or other such computing device.

The network 104 corresponds to a medium through which content and messages flow between various devices in the system environment 100 (e.g., the user computing device 102 and the printing apparatus 106). Examples of the network 104 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 104 in accordance with various wired and wireless communication protocols such as, but not limited to, Transmission Control Protocol and Internet Protocol (TCP/IP), User Datagram Protocol (UDP), and 2G, 3G, 4G, or 5G communication protocols.

The printing apparatus 106 may correspond to a peripheral device that is capable for reproducing text and graphics on a print medium. In other words, the printing apparatus 106 may be configured to perform the print operation based on the print job received from the user computing device 102. Some examples of the printing apparatus 106 may include, but are not limited to, an ink-jet printer, a laser printer, and a thermal printer. For the purpose of ongoing description, the printing apparatus 106 has been considered as the thermal printer. However, it may be contemplated that the scope of the disclosure is not limited to the printing apparatus 106 as the thermal printer.

The control unit 108 may be configured to control the operation of various components of the printing apparatus 106. For example, the control unit 108 may receive the first image data from the user computing device 102 (as the instruction), as is further described in conjunction with FIG. 4. Further, the control unit 108 may be configured to render a buffer image using first image data, as is further described in FIG. 4. Thereafter, the control unit 108 may be configured to cause printing of the buffer image to generate printed content, as is further described in FIG. 4. Additionally, the control unit 108 may be configured to verify the printed content, as is further described in FIG. 4. The structure of the control unit 108 has been described in conjunction with FIG. 3.

Figure 2A:
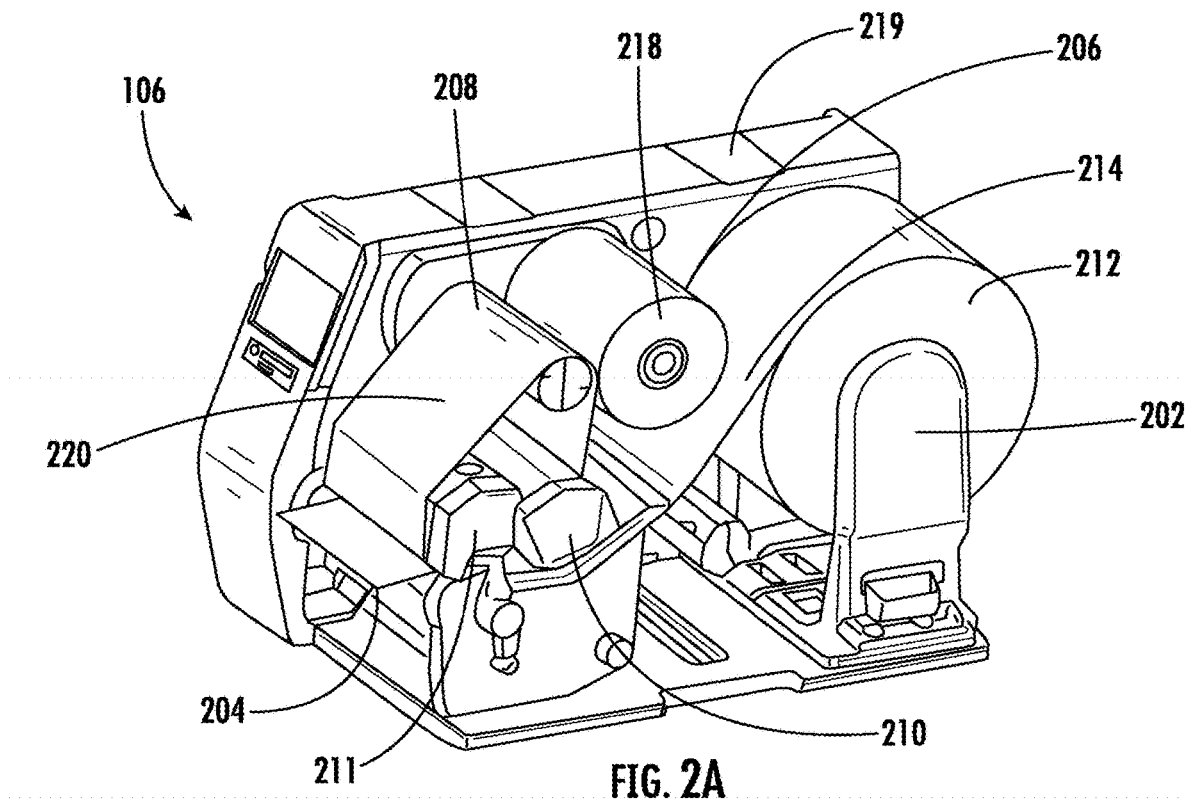
FIGS. 2A, 2B, and 2C illustrate a perspective view of a printing apparatus, according to one or more embodiments described herein.
Figures 2B, 2C:
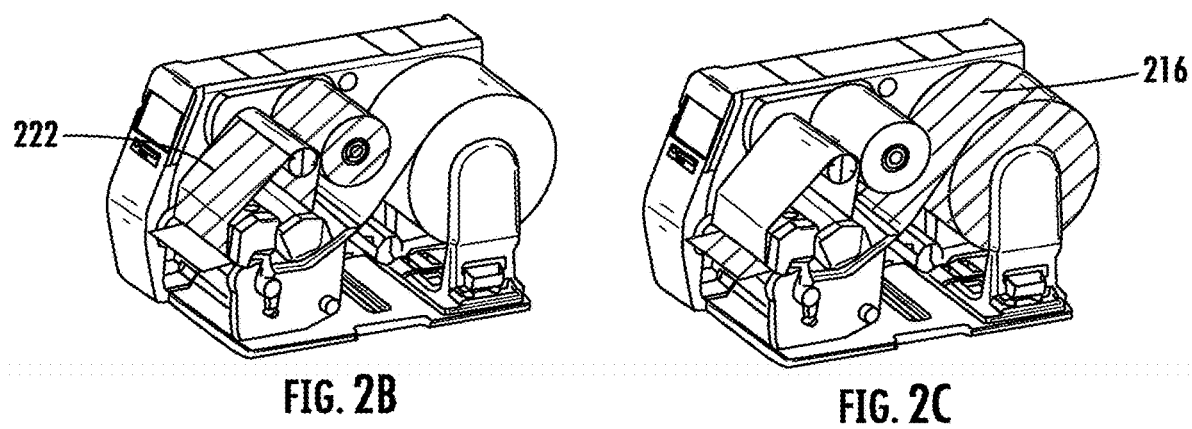

FIGS. 2A, 2B, and 2C illustrate a perspective view of a printing apparatus 106, according to one or more embodiments described herein. The printing apparatus 106 may include a media hub 202, a printer media output 204, a ribbon drive assembly 206, a ribbon take-up hub 208, a print head 210, and a verifier 211.

In an example embodiment, the media hub 202 is configured to receive a media roll 212. In an example embodiment, the media roll 212 may correspond to a roll of a print media 214 that may be a continuous media or may, in some example embodiments, include one or more portions (hereinafter referred to as labels) that are defined (in the print media 214) by means of perforations or one or more marks. In an example embodiment, the media hub 202 is coupled to an actuation unit 219 that actuates the media hub 202. On activation of the actuation unit 219, the media hub 202 causes the media roll 212 to rotate, which further causes the media roll 212 to supply the print media 214 to the print head 210 along a media path 216 (shaded in FIG. 2B). In an example embodiment, along the media path 216, the print media 214 traverses from the media roll 212 through the print head 210 and the verifier 211, to the printer media output 204. A direction of the media traversal along the media path 216 from the media roll 212 to the printer media output 204 is referred to as print direction.

In an example embodiment, the printer media output 204 corresponds to a slot through which the printed media is outputted. The width of the printer media output 204 is in accordance with a width of the print media 214. In some examples, the width of the printer media output 204 may correspond to a maximum width of the print media 214 supported by the printing apparatus 106.

The ribbon drive assembly 206 may receive a ribbon roll 218 that corresponds to a roll of a ribbon 220. In an example embodiment, the ribbon 220 may correspond to an ink media that is utilized to dispose ink onto the print media 214 to print content on the print media 214. In an example embodiment, the ribbon drive assembly 206 may be coupled to the actuation unit 219 that may be configured to actuate the ribbon drive assembly 206. On actuation of the ribbon drive assembly 206, the ribbon drive assembly 206 rotates, which in turn causes the ribbon roll 218 to rotate that causes the ribbon roll 218 to supply the ribbon 220 along a ribbon path 222 (shaded in FIG. 2C). Along the ribbon path 222, the ribbon 220 traverses from the ribbon roll 218 to the print head 210 and further to the ribbon take-up hub 208.

In an example embodiment, the ribbon take-up hub 208 may correspond to an assembly that may receive used ribbon 220 (i.e., a section of the ribbon 220 from which the ink has been is disposed on the print media 214). The ribbon take-up hub 208 may also be coupled to the actuation unit 219 that may be configured to actuate the ribbon take-up hub 208. On actuation, the ribbon take-up hub 208 pulls the ribbon 220 from the ribbon roll 218.

The print head 210 may correspond to a component that is configured to print the content on the print media 214. In an example embodiment, the print head 210 may include a plurality of heating elements (not shown) that are energized and pressed against the ribbon 220 to perform the print operation. In operation, the print head 210 applies heat on a portion of the ribbon 220 and, concurrently, presses the ribbon 220 against the print media 214 to transfer the ink on the print media 214. In an example scenario, where the print media 214 corresponds to thermal paper, the print head 210 may be directly press against the thermal paper to perform the print operation.

During the print operation, one or more heating elements of the plurality of heating elements are energized to perform the print operation. The one or more heating elements may be selected based on the data in a print job. For example, if a letter "A" is to be printed, the one or more heating elements that are energized are positioned on the print head 210 in such a manner that when the print head 210 is pressed against the ribbon 220 and the print media 214, letter "A" gets printed on the print media 214. To press the ribbon 220 against the print media 214, the print head 210 translates in a vertically downward direction (or downward direction) to push the ribbon 220 against the print media 214.

In an example embodiment, after the print operation, the print media 214 and the ribbon 220 traverse along the media path 216 and the ribbon path 222, respectively, such that the printed media traverses to the verifier 211 and the used ribbon 220 traverses to the ribbon take-up hub 208.

In an example embodiment, the verifier 211 may correspond to an image capturing device that may be configured to scan the printed media to generate a second image of the printed media. In an example embodiment, the verifier 211 may include an image sensor such as a Channel MOSFET (CMOS) sensor, charged coupled device (CCD) sensor, and/or contact image sensor (CIS) sensor that may be capable of scanning the printed media. In an example embodiment, for the purpose of ongoing description, the verifier 211 may include the CIS sensor. To this end, during the scanning of the printed media, the actuation unit 219 may cause the traversal of the print media 214 along the media path 216. Accordingly, the CIS sensor scans the printed media to generate the second image.

Figure 3:
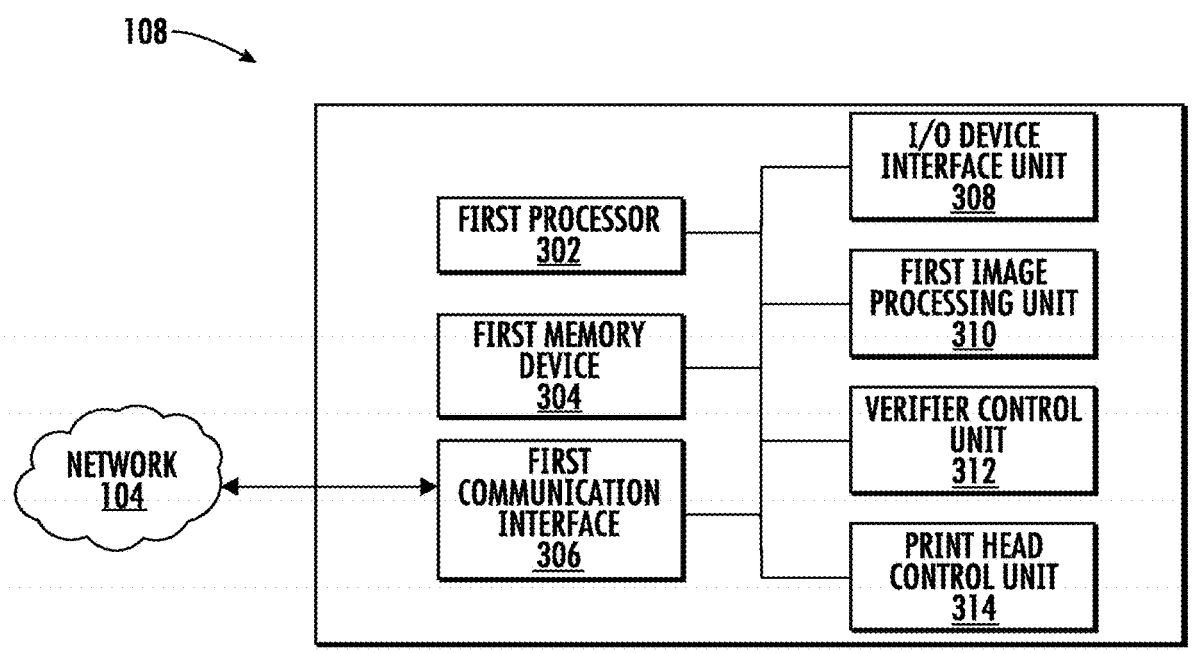
FIG. 3 illustrates a block diagram of a control unit of the printing apparatus, according to one or more embodiments described herein.

FIG. 3 illustrates a block diagram of the control unit 108 of the printing apparatus 106, according to one or more embodiments described herein. In an example embodiment, the control unit 108 includes a first processor 302, a first memory device 304, a first communication interface 306, an input/output (I/O) device interface unit 308, a first image processing unit 310, a verifier control unit 312, and a print head control unit 314.

The first processor 302 may be embodied as a means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 3 as a single processor, in an embodiment, the first processor 302 may include a plurality of processors and signal processing modules. The plurality of processors may be embodied on a single electronic device or may be distributed across a plurality of electronic devices collectively configured to function as the circuitry of the control unit 108. The plurality of processors may be in operative communication with each other and may be collectively configured to perform one or more functionalities of the circuitry of the control unit 108, as described herein. In an example embodiment, the first processor 302 may be configured to execute instructions stored in the first memory device 304 or otherwise accessible to the first processor 302. These instructions, when executed by the first processor 302, may cause the circuitry of the control unit 108 to perform one or more of the functionalities, as described herein.

Whether configured by hardware, firmware/software methods, or by a combination thereof, the first processor 302 may include an entity capable of performing operations according to embodiments of the present disclosure while configured accordingly. Thus, for example, when the first processor 302 is embodied as an ASIC, FPGA or the like, the first processor 302 may include specifically configured hardware for conducting one or more operations described herein. Alternatively, as another example, when the first processor 302 is embodied as an executor of instructions, such as may be stored in the first memory device 304, the instructions may specifically configure the first processor 302 to perform one or more algorithms and operations described herein.

Thus, the first processor 302 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The first memory device 304 may include suitable logic, circuitry, and/or interfaces that are adapted to store a set of instructions that is executable by the first processor 302 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an embodiment, the first memory device 304 may be integrated with the first processor 302 on a single chip, without departing from the scope of the disclosure.

The first communication interface 306 may correspond to a communication interface that may facilitate transmission and reception of messages and data to and from various devices operating in the system environment 100 through the network 104. For example, the first communication interface 306 is communicatively coupled with the user computing device 102 through the network 104. In some examples, through the first communication interface 306, the printing apparatus 106 may receive first image data. The first image data may include a bit stream that may be representative of the first image to be printed on the print media 214. Examples of the first communication interface 306 may include, but are not limited to, an antenna, an Ethernet port, a USB port, a serial port, or any other port that can be adapted to receive and transmit data. The first communication interface 306 transmits and receives data and/or messages in accordance with the various communication protocols, such as but not limited to, I2C, TCP/IP, UDP, and 2G, 3G, 4G, or 5G communication protocols.

The I/O device interface unit 308 may include suitable logic and/or circuitry that may be configured to enable communication between various components of the printing apparatus 106. For example, the I/O device interface unit 308 may enable communication of the control unit 108 with the print head 210 and the verifier 211, in accordance with one or more device communication protocols such as, but not limited to, I2C communication protocol, Serial Peripheral Interface (SPI) communication protocol, Serial communication protocol, Control Area Network (CAN) communication protocol, and 1-Wire® communication protocol. In some examples, the I/O device interface unit 308 may be configured to transmit a first instruction to the print head 210 to print content on the print media 214, as is further described in conjunction with FIG. 4. Additionally, the I/O device interface unit 308 may be configured to transmit a second instruction to the verifier 211 to scan the printed content, as is further described in conjunction with FIG. 4. Further, the I/O device interface unit 308 may transmit a third instruction to the actuation unit 219 causing traversal of the print media 214 along the print direction. Some examples of the I/O device interface unit 308 may include, but not limited to, a Data Acquisition (DAQ) card, an electrical drives driver circuit, and/or the like.

Figure 4:
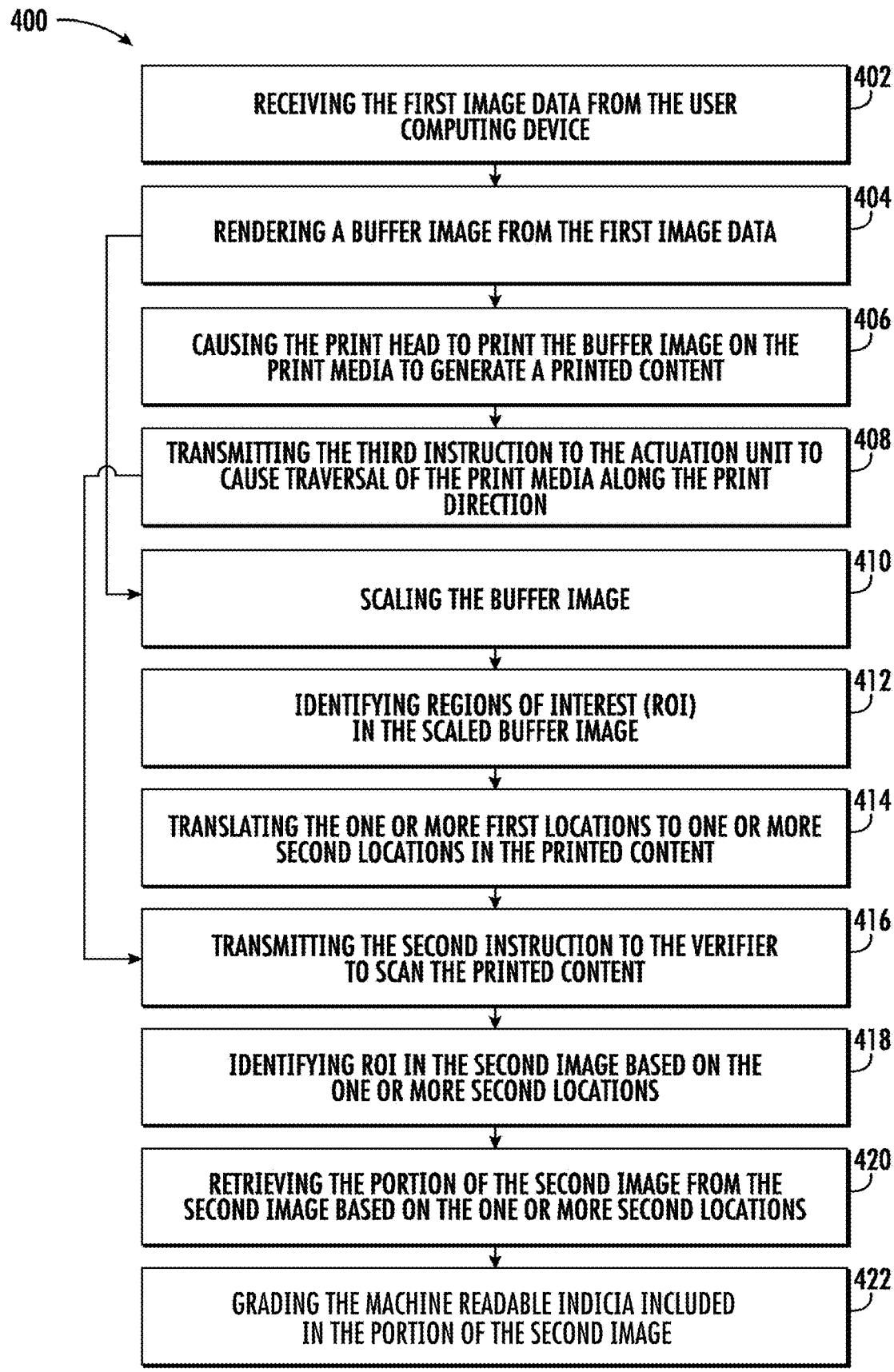
FIG. 4 illustrates a flowchart for operating the printing apparatus, according to one or more embodiments described herein.

The first image processing unit 310 may include suitable logic and/or circuitry that may enable the first image processing unit 310 to render a buffer image from the first image data, as is further described in conjunction with FIG. 4. Additionally or alternatively, the first image processing unit 310 may be configured to scale the buffer image, as is further described in conjunction with FIG. 4. In some examples, the first image processing unit 310 may identify a region of interest in the scaled buffer image, as is further described in conjunction with FIG. 4. In an example embodiment, the first image processing unit 310 may utilize one or more known image processing techniques to manipulate and/or modify the buffer image. Some examples of the one or more image processing techniques may include, but not limited to, edge detection, and object identification techniques such as Scale invariant feature transform (SIFT). The first image processing unit 310 may be implemented using one or more of Application Specific Integrated Circuit (ASIC) and Field Programmable Gate Array (FPGA).

The verifier control unit 312 may include suitable logic and/or circuitry that may enable the verifier control unit 312 to control one or more operations of the verifier 211. For example, the verifier control unit 312 may be configured to transmit the second instruction through the I/O device interface unit 308 to the verifier 211 to scan the printed content. In some examples, the second instruction may include information pertaining to a portion of the printed content to be scanned by the verifier 211. The verifier control unit 312 may be implemented using may be implemented using one or more of Application Specific Integrated Circuit (ASIC) and Field Programmable Gate Array (FPGA).

A print head control unit 314 may include suitable logic and/or circuitry that may enable the print head control unit 314 to cause the print head 210 to print content on the print media 214. For example, the print head control unit 314314 may transmit the first instruction (through the I/O device interface unit 308) to the print head 210 to print content on the print media 214, as is further described in conjunction with FIG. 4. The print head control unit 314 may be implemented using may be implemented using one or more of Application Specific Integrated Circuit (ASIC) and Field Programmable Gate Array (FPGA).

The operation of the control unit 108 is further described in conjunction with FIG. 4.

FIGS. 4, 5, 6A, 6B, 7, 8, 9, 11, 14, and 15 illustrate example flowcharts and example methods of the operations performed by an apparatus, such as the printing apparatus 106 having control unit 108, and the user computing device 102 of FIG. 1 in accordance with example embodiments of the present disclosure. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 4, 5, 6A, 6B, 7, 8, 9, 11, 14, and 15, when executed, convert a computer or processing circuitry into a particular machine configured to perform an example embodiment of the present invention. Accordingly, the operations of FIGS. 4, 5, 6A, 6B, 7, 8, 9, 11, 14, and 15, define an algorithm for configuring a computer or processor, to perform an example embodiment. In some cases, a general purpose computer may be provided with an instance of the processor which performs the algorithm of FIGS. 4, 5, 6A, 6B, 7, 8, 9, 11, 14, and 15, to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

FIG. 4 illustrates a flowchart 400 for operating the printing apparatus 106, according to one or more embodiments described herein.

In some examples, those skilled in the art would appreciate that prior to operating the printing apparatus 106 to print content, the first processor 302 may be configured to calibrate the printing apparatus 106. During the calibration of the printing apparatus 106, the first processor 302 may be configured to determine a type of the print media 214 installed in the printing apparatus 106. Further, the first processor 302 may be configured to determine a length of the labels in the print media 214. In an example embodiment, the first processor 302 may be configured to utilize a media sensor (not shown) in the printing apparatus 106 to determine the length of the labels in the print media 214.

Thereafter, at step 402, the printing apparatus 106 may include means, such as the control unit 108, the first processor 302, the first communication interface 306, and/or the like, for receiving the first image data from the user computing device 102. In an example embodiment, the first image data may include a bit stream that is representative of the first image to be printed on the print media 214. In some examples, the bit stream is a compressed form the first image. Further, the bit stream may be representative of the first image either in a monotone format, a continuous tone format or in a half tone format. In some examples, in the continuous tone format, a pixel in an image can have any value. On the other hand, in the halftone format, the image is represented in form of multiple dots, where the size of the dots and the space amongst the dots are varied in order to generate a perceivable image. Further, in monotone format, a pixel in the image can have two values either black or white.

At step 404, the printing apparatus 106 may include means, such as the control unit 108, the first processor 302, the first image processing unit 310, and/or the like, for rendering a buffer image from the first image data (i.e., the bit stream). In an example embodiment, the first image processing unit 310 may be configured to utilize one or more known decoding techniques such as, but not limited to, bitmap decoder, Joint Photographic Experts Group (JPEG) decoder, wavelet decoder, Graphics Interchange Format (GIF) decoder, Portable Network Graphics (PNG) decoder, Picture Exchange (PCX) decoder, and/or the like for rendering the buffer image. The first image processing unit 310 may render in the buffer image in the monotone format, continuous tone format and/or the half tone format based on the information included in the bit stream (pertaining to the monotone, continuous tone and/or half tone).

At step 406, the printing apparatus 106 may include means, such as the control unit 108, the first processor 302, the I/O device interface unit 308, the print head control unit 314, and/or the like, for causing the print head 210 to print the buffer image on the print media 214 to generate a printed content. Printing the buffer image is further described in conjunction with FIG. 5. At step 408, the printing apparatus 106 may include means, such as the control unit 108, the first processor 302, the I/O device interface unit 308, the verifier control unit 312, and/or the like, for transmitting the third instruction to the actuation unit 219 to cause traversal of the print media 214 along the print direction. Accordingly, the printed content traverses from the print head 210 to the verifier 211.

Concurrent to the steps 406 and 408, at step 410, the printing apparatus 106 may include means, such as the control unit 108, the first processor 302, the first image processing unit 310, and/or the like, for scaling the buffer image. In an example embodiment, scaling an image may include modification in an area of the image. For example, scaling an image may include modifying a resolution of the image.

In an example embodiment, the first image processing unit 310 may be configured to scale the buffer image in order to modify the area of the buffer image. The first image processing unit 310 may be configured to scale the buffer image based on a predetermined scale ratio. The predetermined scale ratio may correspond to a factor by which an area of the image is modified. For instance, if the predetermined scale ratio is 4:1, the first image processing unit 310 may be configured to reduce the area covered by the image by half. Accordingly, if the image has the resolution 1024×968, the scaling the image will generate an image with resolution 512×484. Similarly, if the predetermined scale ratio is 1:4, the first image processing unit 310 may be configured to scale the image having the resolution 1024×968 to an image with the resolution 2048×1936. In some examples, the predetermined scale ratio may be pre-stored in the first memory device 304 during the manufacturing of the printing apparatus 106. In another embodiment, the predetermined scale ratio may be configurable. In such an embodiment, the user of the printing apparatus 106 may define the predetermined scale ratio by utilizing the user computing device 102. In another embodiment, the user of the printing apparatus 106 may define the predetermined scale ratio using the user interface provided on the printing apparatus 106.

In some examples, the first image processing unit 310 may be configured to determine the scale ratio dynamically. For example, the first image processing unit 310 may be configured to determine the scale ratio based on a size of the printed content and a resolution of the printed content. For example, if the size of the printed content and the resolution of the printed content is less than a first threshold of size and a second threshold of resolution, respectively, the first image processing unit 310 may be configured to determine the scale ratio as 1:1. However, if the size of the printed content and the resolution of the printed content is greater than a first threshold of size and a second threshold of resolution, respectively, the first image processing unit 310 may be configured to determine the scale ratio as 4:1. In an example embodiment, the scope of the disclosure is not limited to having two scale ratios as 1:1 and 4:1. In an example embodiment, the first image processing unit 310 may determine other scale ratios (e.g., 2:1, 3:1) based on the size of the printed content and the resolution of the printed content.

In some examples, the first image processing unit 310 may be configured to reduce the area of the buffer image based on the predetermined scale ratio. Accordingly, the first image processing unit 310 may scale the buffer image to generate a scaled buffer image, where the area of the scaled buffer image is less than the area of the buffer image. In an example embodiment, the first image processing unit 310 may utilize one or more known scaling techniques such as, but are not limited to, Nearest-neighbor interpolation, Bilinear and Bicubic algorithm, Sinc and Lanczos resampling, Box sampling, and/or the like, to scale the buffer image. An example method for scaling of the buffer image is further illustrated in FIG. 7.

At step 412, the printing apparatus 106 may include means, such as the control unit 108, the first processor 302, the first image processing unit 310, and/or the like, for identifying a regions of interest (ROI) in the scaled buffer image. In an example embodiment, the ROI in the scaled buffer image may correspond to a portion of the scaled buffer image that includes a machine readable indicia. In some examples, the scope of the disclosure is not limited to the ROI, in the scaled buffer image, comprising the machine readable indicia. In an example embodiment, the ROI in the scaled buffer image may include other content present in the scaled buffer image. For example, the ROI in scaled buffer image may include an address field, a text content, a graphic content such as a trademark, and/or the like. For the purpose of ongoing description, the ROI in the scaled buffer image is considered to include the machine readable indicia. The identification of the ROI in the scaled buffer image is further described in conjunction with FIG. 8, FIG. 9, and FIG. 10.

In some examples, during the identification of the ROI in the scaled buffer image, the first image processing unit 310 may be configured to determine the one or more first locations in the scaled buffer image that indicates the location of the ROI in the scaled buffer image. In an example embodiment, the one or more first locations (in the scaled buffer image) may define the periphery of the ROI. Accordingly, the one or more first locations may encompass the ROI. More particularly, if the first image processing unit 310 creates a virtual bounding box that connects each of the one or more first locations in the scaled buffer image, the virtual bounding box may encompass the ROI in the scaled buffer image. In an example embodiment, identifying the one or more first locations may include determining the coordinates of the one or more first locations in the scaled buffer image. The identification of the one or more first locations is further described in conjunction with FIG. 8, FIG. 9, and FIG. 10.

At step 414, the printing apparatus 106 may include means, such as the control unit 108, the first processor 302, the first image processing unit 310, and/or the like, for translating the one or more first locations (identified for the ROI in the scaled buffer image) to one or more second locations in the printed content. In an example embodiment, the one or more second locations may correspond to locations on the printed content that encompasses the ROI in the printed content. More particularly, the one or more second locations may define the periphery of the ROI in the printed content. A virtual bounding, connecting each of the one or more second locations, may encompass the ROI in the printed content. In an example embodiment, translating the one or more first locations to the one or more second locations on the printed content may include determining the coordinates of the one or more second locations in the printed content. The translating of the one or more first locations to the one or more second locations is further described in conjunction with FIG. 11.

At step 416, the printing apparatus 106 may include means, such as the control unit 108, the first processor 302, the verifier control unit 312, the I/O device interface unit 308, and/or the like, for transmitting the second instruction to the verifier 211 to scan the printed content. Since the verifier 211 includes the CIS sensor, accordingly, the verifier 211 scans the printed content iteratively (e.g., line by line). To enable iterative scanning of the printed content, the I/O device interface unit 308 may be configured to transmit the third instruction to the actuation unit 219 to cause traversal of the print media 214 during the scanning of the printed content. Accordingly, the verifier 211 scans the printed content (during the traversal of the print media 214) to generate a second image. In some examples, the second image is a digital representation of the printed content. In some example, the second image and the printed content may have one to one correspondence. For example, if a graphic symbol is located at coordinates (x, y) in the printed content, the graphic symbol is located at the same coordinates in the second image (i.e., x, y).

In an example embodiment, prior to scanning the printed content, the verifier control unit 312 may determine whether the verifier 211 is aligned with the printed content. In an example embodiment, the verifier control unit 312 may determine the alignment between the printed content and the verifier 211 by utilizing known distances between the print head 210 and the verifier 211. The determination of the alignment of the verifier 211 with the printed content is further described in conjunction with FIG. 6A and FIG. 6B.

At step 418, the printing apparatus 106 may include means, such as the control unit 108, the first processor 302, the first image processing unit 310, and/or the like, for identifying the ROI in the second image based on the one or more second locations (determined in the step 414). Since the virtual bounding box, connecting each of the one or more second locations, encompasses the ROI in the printed content and since the second image is the digital representation of the printed content, therefore, the one or more second locations (in the second image) may encompass the ROI in the second image. Accordingly, the one or more second locations may define the periphery of the ROI.

At step 420, the printing apparatus 106 may include means, such as the control unit 108, the first processor 302, the first image processing unit 310, and/or the like, for retrieving the portion of the second image from the second image based on the one or more second locations. In an example embodiment, the portion of the second image includes the ROI. Since ROI in the second image includes the machine readable indicia and the second image is a digital representation of the printed content, accordingly, the portion of the second image includes a digital representation of the printed machine readable indicia.

In some examples, the scope of the disclosure is not limited to scanning the complete printed content to generate the second image and, thereafter, retrieving the portion of the second image (i.e., ROI) from the second image. In an example embodiment, the verifier control unit 312 may be configured to transmit a fourth instruction to the verifier 211 that includes information pertaining to the one or more second locations. For example, the information pertaining to the one or more second locations may include the coordinates of the one or more second locations in the printed content. Upon receiving the fourth instruction, the verifier 211 may be configured to scan only a portion of the printed content represented by the coordinates of the one or more second locations in the printed content. Since the one or more second locations define the periphery of the ROI in the printed content, therefore, the verifier 211 may scan the ROI in the printed content. Accordingly, the second image generated by the verifier 211 only includes the ROI.

In an example embodiment, prior to scanning the printed content, the verifier control unit 312 may determine whether the verifier 211 is aligned with the portion of the printed content. In an example embodiment, the verifier control unit 312 may determine the alignment between the portion of the printed content and the verifier 211 by utilizing known distances between the print head 210, the verifier 211, and the coordinates of the one or more second locations. The determination of the alignment between the verifier 211 and the portion of the printed content is further described in conjunction with FIG. 6B.

At step 422, the printing apparatus 106 may include means, such as the control unit 108, the first processor 302, the first image processing unit 310, and/or the like, for grading the machine readable indicia included in the portion of the second image. In an example embodiment, the first image processing unit 310 may be configured to utilize American National Standards Institute (ANSI), ISO15415, and/or ISO/IEC 15416 standards for grading the machine readable indicia included in the portion of the second image. In another embodiment, where the second image only includes the machine readable indicia, the first image processing unit 310, may grade the machine readable indicia included in the second image.

In some examples, the scope of the disclosure is not limited to determining the one or more second locations from the scaled buffer image to retrieve the portion of the second image from the second image. In an example embodiment, if the size of the printed content and the resolution of the printed content is less than the first threshold of the size and the second threshold of the resolution, the first processor 302 directly identify and retrieve the machine readable indicia from the printed content.

Figure 5:
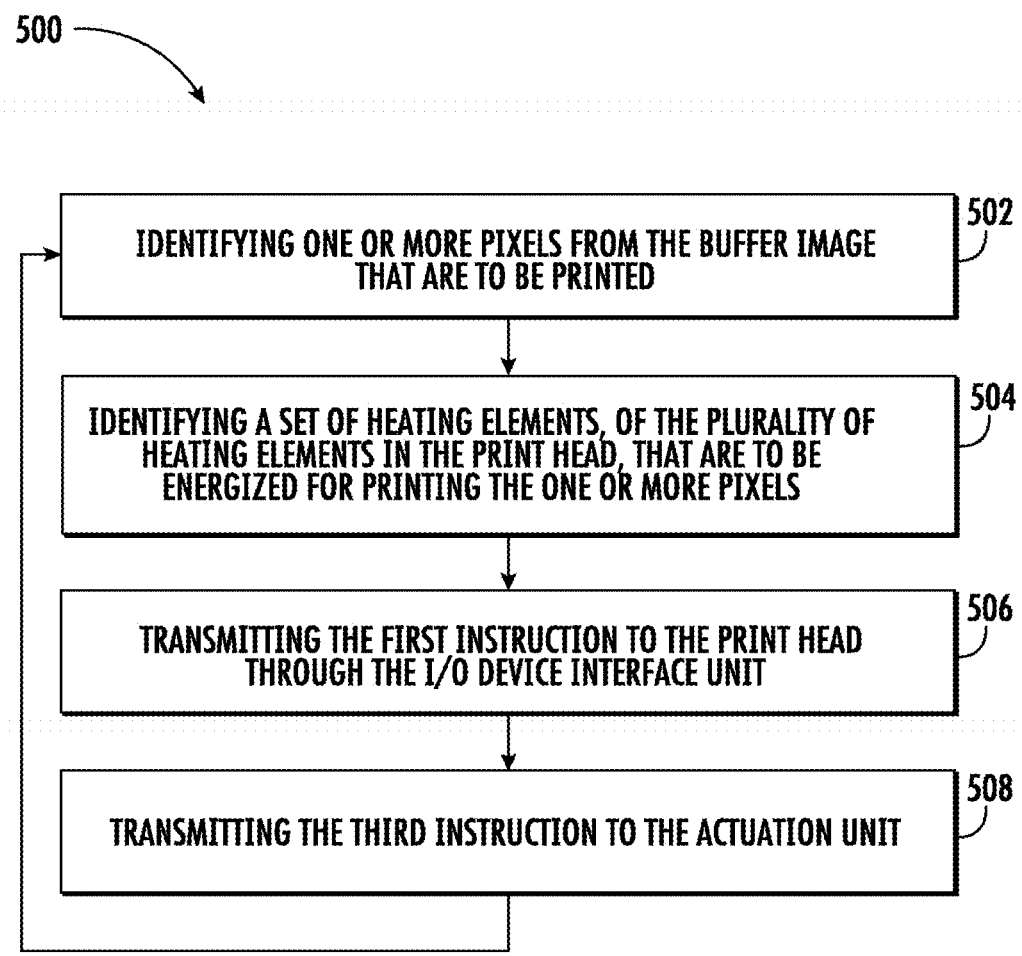
FIG. 5 illustrates a flowchart of a method for printing the buffer image on a print media, according to one or more embodiments described herein.

FIG. 5 illustrates a flowchart 500 of a method for printing the buffer image on the print media 214, according to one or more embodiments described herein. In some examples, since the print head 210 includes the plurality of heating elements that are positioned on the print head 210 in form of a rectangular array, therefore, print head 210 is capable of sequentially printing the buffer image. For example, the print head 210 is capable of printing the buffer image iteratively based on the traversal of the print media 214 and the portion of the buffer image to be printed. For example, the print head 210 is capable of printing a row of pixels (i.e., the portion of the buffer image) at a time instant.

Therefore, at step 502, the printing apparatus 106 may include means, such as the control unit 108, the first processor 302, the first image processing unit 310, the print head control unit 314 and/or the like, for identifying one or more pixels from the buffer image that are to be printed. In some examples, the one or more pixels (to be printed) may be arranged in one or more rows of the buffer image. Further, the print head control unit 314 may identify a count of the one or more rows of pixels to be printed (in an iteration) based on a width of the rectangular array in which the plurality of heating elements is arranged in the print head 210.

At step 504, the printing apparatus 106 may include means, such as the control unit 108, the first processor 302, the print head control unit 314, and/or the like, for identifying a set of heating elements, of the plurality of heating elements in the print head 210, that are to be energized for printing the one or more pixels. In some examples, the print head control unit 314 may be configured to identify the set of heating elements based on one or more third locations of the one or more pixels that are to be printed. In some examples, the set of heating elements and the one or more third locations (of the one or more pixels) may have one to one correspondence. For example, if the left most pixel of the buffer image is to be printed, the print head control unit 314 may identify the left most heating element of the print head 210 as the set of heating elements.

In another example, the print head control unit 314 may utilize a look-up table that includes a mapping between the one or more third locations (of the one or more pixels) and the corresponding heating element of the plurality of heating elements to be energized. Following table illustrates an example look-up table:

TABLE 1

Look-up table depicting mapping between the one or more third locations and the heating elements

| Third locations | Heating element |
|---|---|
| (0, 0) | Heating element-1 |
| (15, 0) | Heating element-2 |
| (7, 0) | Heating element-3 |

In some examples, the scope of the disclosure is not limited to utilizing the look-up table to identify the set of heating elements to be energized. In an example embodiment, the print head control unit 314 may utilize known mathematical relationship between the one or more third locations and the plurality of heating elements to identify the set of heating elements to be energized for printing the one or more pixels (of the buffer image) on the print media 214.

At step 506, the printing apparatus 106 may include means, such as the control unit 108, the first processor 302, the print head control unit 314, the I/O device interface unit 308 and/or the like, for transmitting the first instruction to the print head 210 through the I/O device interface unit 308. In an example embodiment, the first instruction may include the information pertaining to the set of heating elements that are to be energized. Upon receiving the first instruction, the print head 210 may energize the set of heating elements. Energizing the set of heating elements causes the set of heating elements to heat up. Accordingly, when the set of heating elements press against the ribbon 220, the heat from the set of heating elements causes transfer of the ink from the ribbon 220 to print media 214, thereby printing the one or more pixels (identified in the step 502).

At step 508, the printing apparatus 106 may include means, such as the control unit 108, the first processor 302, the print head control unit 314, the I/O device interface unit 308 and/or the like, for transmitting the third instruction to the actuation unit 219. The third instruction may pertain to activating the actuation unit 219. Upon activation, the actuation unit 219 causes traversal of the print media 214 along the print direction. Thereafter, the first processor 302 may be configured to repeat the step 502 till the complete buffer image is printed. The printed buffer image has been referred to as the printed content.

Figure 6A:
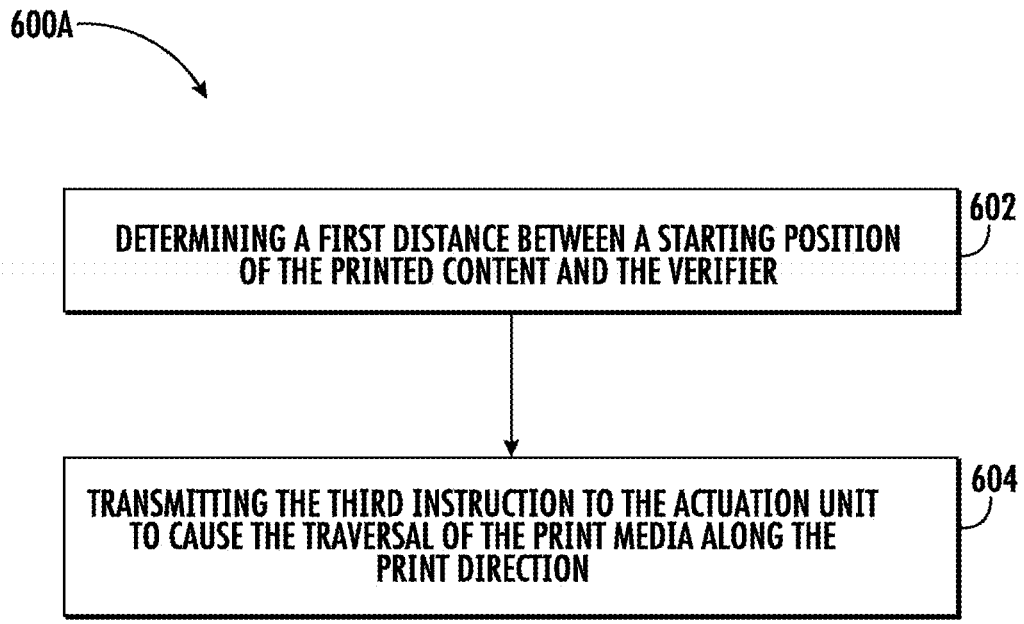
FIG. 6A illustrates a flowchart of a method for determining whether the printed content is aligned with a verifier, according to one or more embodiments described herein.

FIG. 6A illustrates a flowchart 600A of a method for determining whether the printed content is aligned with the verifier 211, according to one or more embodiments described herein.

At step 602, the printing apparatus 106 includes means such as the control unit 108, the first processor 302, the verifier control unit 312, and/or the like for determining a first distance between a starting position of the printed content and the verifier 211. In an example embodiment, the starting position of the printed content may correspond to a location of the perforation on print media 214. As discussed, the perforation on the print media 214 may be utilized to divide the media into the labels. The buffer image may be printed on a label in the print media. Accordingly, the starting position of the printed content may correspond to the location of the perforation.

In an example embodiment, the verifier control unit 312 may retrieve a second distance between the verifier 211 and the print head 210. In some examples, the second distance is predefined during manufacturing of the printing apparatus 106. Further, the second distance is stored in the first memory device 304. Additionally, the verifier control unit 312 may be configured to retrieve the length of the label (determined during calibration of the printing apparatus 106) in the print media 214 from the first memory device 304. In an example embodiment, the verifier control unit 312 may be configured to determine the first distance between the starting point of the printed content and the verifier 211 using the following formula:

First distance between the starting point of the printed content=the second distance between the print head 210 and the verifier 211−the length of the label      Formula (1):

At step 604, the printing apparatus 106 includes means such as the control unit 108, the first processor 302, the verifier control unit 312, the I/O device interface unit 308 and/or the like for transmitting the third instruction to the actuation unit 219 to cause the traversal of the print media 214 along the print direction. In some examples, the I/O device interface unit 308 may cause the print media 214 to traverse by the first distance (determined in the step 602).

As discussed above, the verifier 211 may be configured to scan the portion of the printed content instead of the complete printed content. The alignment of the portion of the printed content and verifier 211 is further described in FIG. 6B.

Figure 6B:
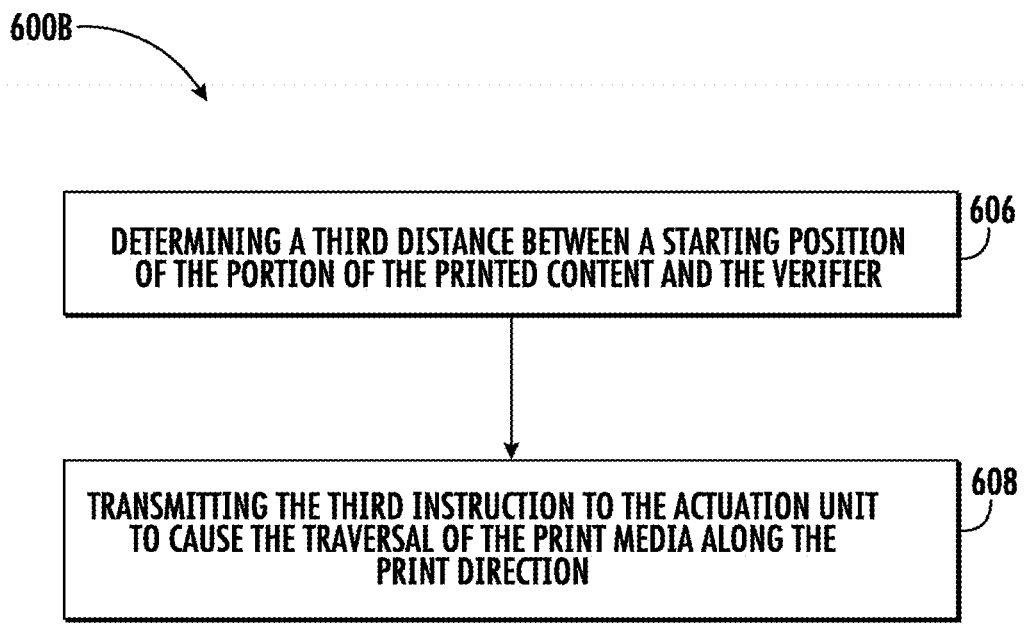
FIG. 6B illustrates a flowchart of a method for determining whether the portion of the printed content is aligned with a verifier, according to one or more embodiments described herein.

FIG. 6B illustrates a flowchart 600B of a method for determining whether the portion of the printed content is aligned with the verifier 211, according to one or more embodiments described herein.

At step 606, the printing apparatus 106 includes means such as the control unit 108, the first processor 302, the verifier control unit 312, and/or the like for determining a third distance between a starting position of the portion of the printed content and the verifier 211.

In an example embodiment, the verifier control unit 312 may retrieve the second distance between the verifier 211 and the print head 210. Additionally, the verifier control unit 312 may be configured to retrieve the length of the label in the print media 214 from the first memory device 304. Further, additionally, the verifier control unit 312 may be configured to retrieve coordinates the one or more second locations on the printed content from the first memory device 304. As discussed, the one or more second locations may encompass the ROI in the printed content. Thereafter, in an example embodiment, the verifier control unit 312 may be configured to determine the third distance between the starting position of the portion of the printed content and the verifier 211 using the following formula:

Third distance=(second distance between the print head 210 and the verifier 211−length of the label in the print head)+(distance between the
perforation on the label and the one or more
second locations) Formula (2):

At step 608, the printing apparatus 106 includes means such as the control unit 108, the first processor 302, the verifier control unit 312, the I/O device interface unit 308 and/or the like for transmitting the third instruction to the actuation unit 219 to cause the traversal of the print media 214 along the print direction. In some examples, the I/O device interface unit 308 may cause the print media 214 to traverse by the third distance (determined in the step 606). Accordingly, the portion of the printed content aligns with the verifier 211.

Figure 7:
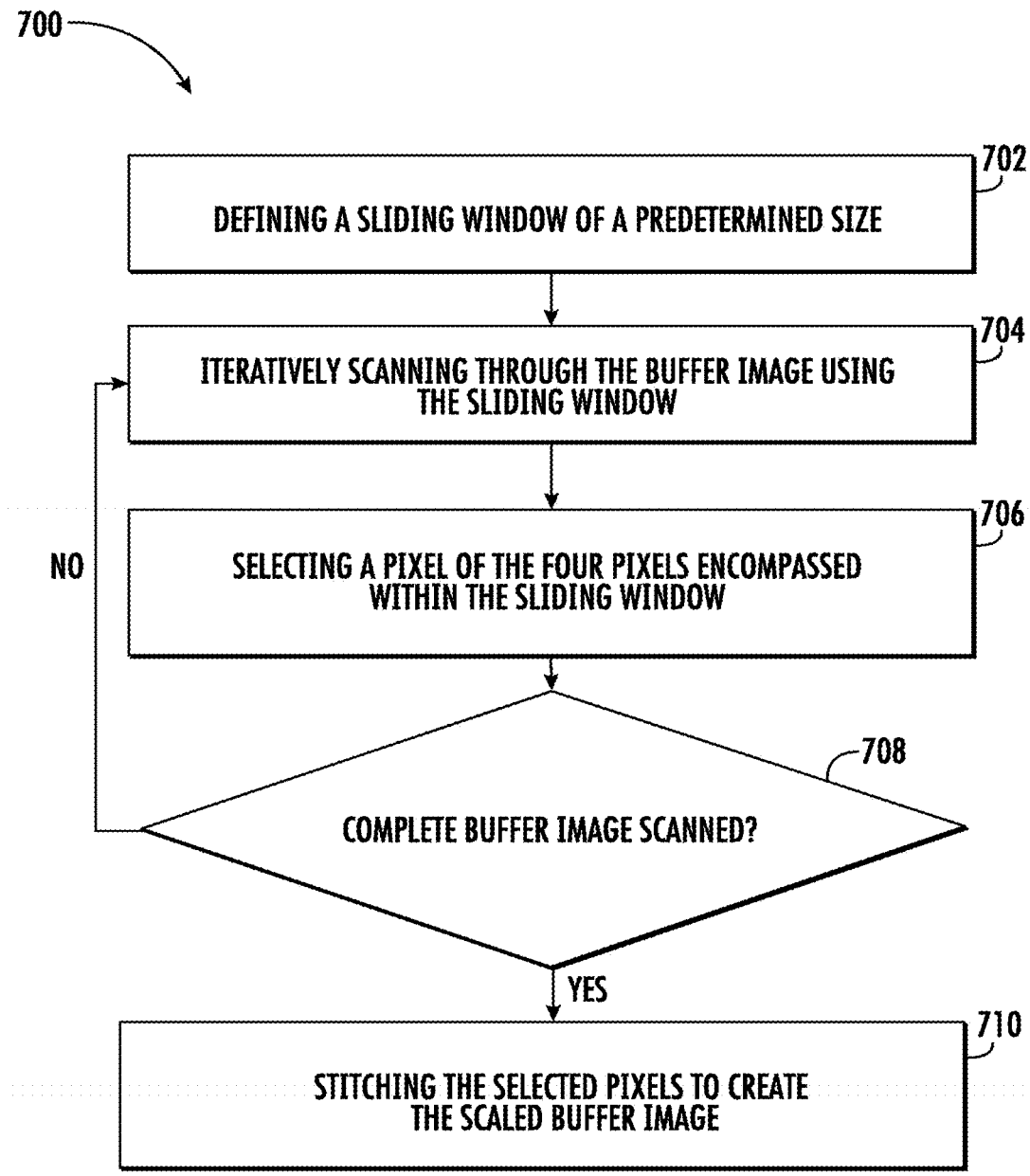
FIG. 7 illustrates a flowchart of a method for scaling the buffer image, according to one or more embodiments described herein.

FIG. 7 illustrates a flowchart 700 of a method for scaling the buffer image according to one or more embodiments described herein.

At step 702, the printing apparatus 106 includes means such as the control unit 108, the first processor 302, the first image processing unit 310, and/or the like for defining a sliding window of a predetermined size. In an example embodiment, the predetermined size of the sliding window may be defined during the manufacturing of the printing apparatus 106. Additionally or alternately, the user of the printing apparatus 106 may define the predetermined size of the sliding window by providing input through the user computing device 102 or through the user interface provided on the printing apparatus 106. In another example, the first image processing unit 310 may automatically define the predetermined size of the sliding window based on the predetermined scale ratio. For example, if the scale ratio is 4:1, the first image processing unit 310 may define the sliding window having the size of 4×1. In some examples, the scope of the disclosure is not limited to the sliding window having the size of 4 by 1. In an example embodiment, the sliding window may have any other size, without departing from the scope of the disclosure. For the purpose of describing the flowchart 700, the size of the sliding window is considered to be 4×1.

At step 704, the printing apparatus 106 includes means such as the control unit 108, the first processor 302, the first image processing unit 310, and/or the like for iteratively scanning through the buffer image using the sliding window. For example, during first iteration, the sliding window may be configured to encompass first four pixels of the buffer image.

At step 706, the printing apparatus 106 includes means such as the control unit 108, the first processor 302, the first image processing unit 310, and/or the like for selecting a pixel of the four pixels encompassed within the sliding window. In some examples, the first image processing unit 310 may be configured to randomly select the pixel of the four pixels. In another example, the first image processing unit 310 may be configured to generate a new pixel based on a pixel value of the four pixels encompassed within the sliding window. In an example embodiment, the pixel value of the pixel may include luminance value and/or color value. To generate the new pixel, the first image processing unit 310 may be configured to determine an average pixel value of the four pixels.

At step 708, the printing apparatus 106 includes means such as the control unit 108, the first processor 302, the first image processing unit 310, and/or the like for determining whether the sliding window has scanned complete buffer image. If the first image processing unit 310 determines that the sliding window has scanned the complete buffer image, the first image processing unit 310 may be configured to perform the step 710. However, if the first image processing unit 310 determines that the sliding window has not scanned the complete buffer image, the first image processing unit 310 may be configured to repeat the step 704.

At step 710, the printing apparatus 106 includes means such as the control unit 108, the first processor 302, the first image processing unit 310, and/or the like for stitching the selected pixels to create the scaled buffer image. Since the scaled buffer image is formed of pixels that have been selected out of every four pixels of the buffer image, the area of the scaled buffer image is less than the area of the buffer image.

Figure 8:
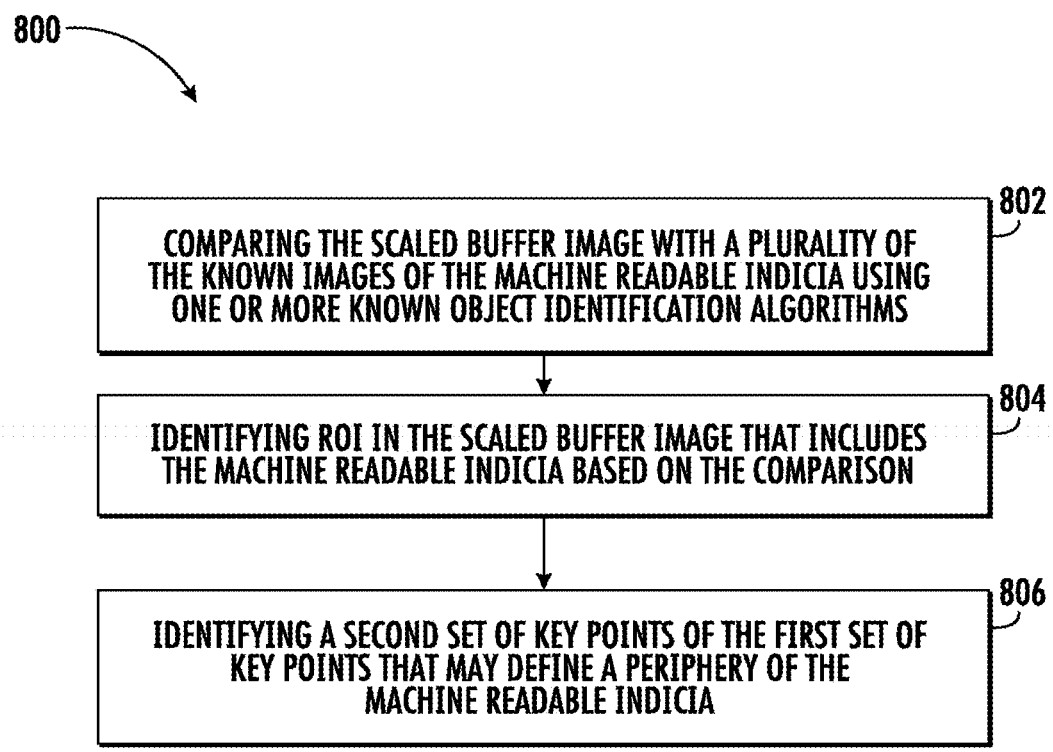
FIG. 8 illustrates a flowchart of method for identifying ROI in the scaled buffer image, according to one or more embodiments described herein.

FIG. 8 illustrates a flowchart 800 of method for identifying ROI in the scaled buffer image, according to one or more embodiments described herein. As discussed above in FIG. 4, the ROI in the scaled buffer image may correspond to portions of the scaled buffer image that includes machine readable indicia. Therefore, the foregoing description of identifying the ROI has been described considering that the ROI of the scaled buffer image includes the machine readable indicia.

At step 802, the printing apparatus 106 includes means such as the control unit 108, the first processor 302, the first image processing unit 310, and/or the like for comparing the scaled buffer image with a plurality of the known images of the machine readable indicia using one or more known object identification algorithms such as, but not limited to SIFT, Speeded up robust features (SURF), deep neural networks, convolutional neural network (CNN), and/or the like. For example, in some examples, the first image processing unit 310 may be configured to identify one or more key points in the scaled buffer image. Further, the first image processing unit 310 may be configured to compare the one or more key points with one or more key points in the one or more known images of the machine readable indicia.

At step 804 the printing apparatus 106 includes means such as the control unit 108, the first processor 302, the first image processing unit 310, and/or the like for identifying the ROI in the scaled buffer image that includes the machine readable indicia based on the comparison between the scaled buffer image and the one or more known images of the machine readable indicia. For example, the first image processing unit 310 may identify, based on the comparison, a first set of key points of the one or more key points that correspond to the machine readable indicia. Additionally, the first image processing unit 310 may determine the coordinates of the first set of key points in the scaled buffer image. In some examples, the first image processing unit 310 may determine the coordinates of the first set of key points in Cartesian coordinate system. However, in some examples, the scope of the disclosure is not limited to determining the coordinates of the first set of key points in the Cartesian coordinate system. In an example embodiment, the first image processing unit 310 may determine the coordinates of the first set of key points in other coordinate systems such as, but not limited to, polar coordinate systems.

At step 806, the printing apparatus 106 includes means such as the control unit 108, the first processor 302, the first image processing unit 310, and/or the like for identifying a second set of key points of the first set of key points that may define a periphery of the machine readable indicia. In some examples, the first image processing unit 310 may determine a minima and/or maxima amongst the coordinates of the first set of key points to identify the second set of key points. Determining minima amongst the coordinates of the first set of key points may identify key points that have minimum coordinate value amongst the coordinates of the second set of key points. Similarly, determining maxima amongst the coordinates of the first set of key points may identify key points that have maximum coordinate value amongst the coordinates of the second set of key points. In an example embodiment, the first image processing unit 310 may identify the key points with minimum coordinate values and the key points with maximum coordinate values as the second set of key points.

The second set of key points may define the periphery of the machine readable indicia. Further, the first image processing unit 310 may consider the location of each key point in the second set of key points as the one or more first locations in the scaled buffer image. In an example embodiment, as discussed above in FIG. 3, the one or more first locations encompass the machine readable indicia. Further, the first image processing unit 310 may be configured to store the coordinates of the one or more first locations in the first memory device 304.

Figure 9:
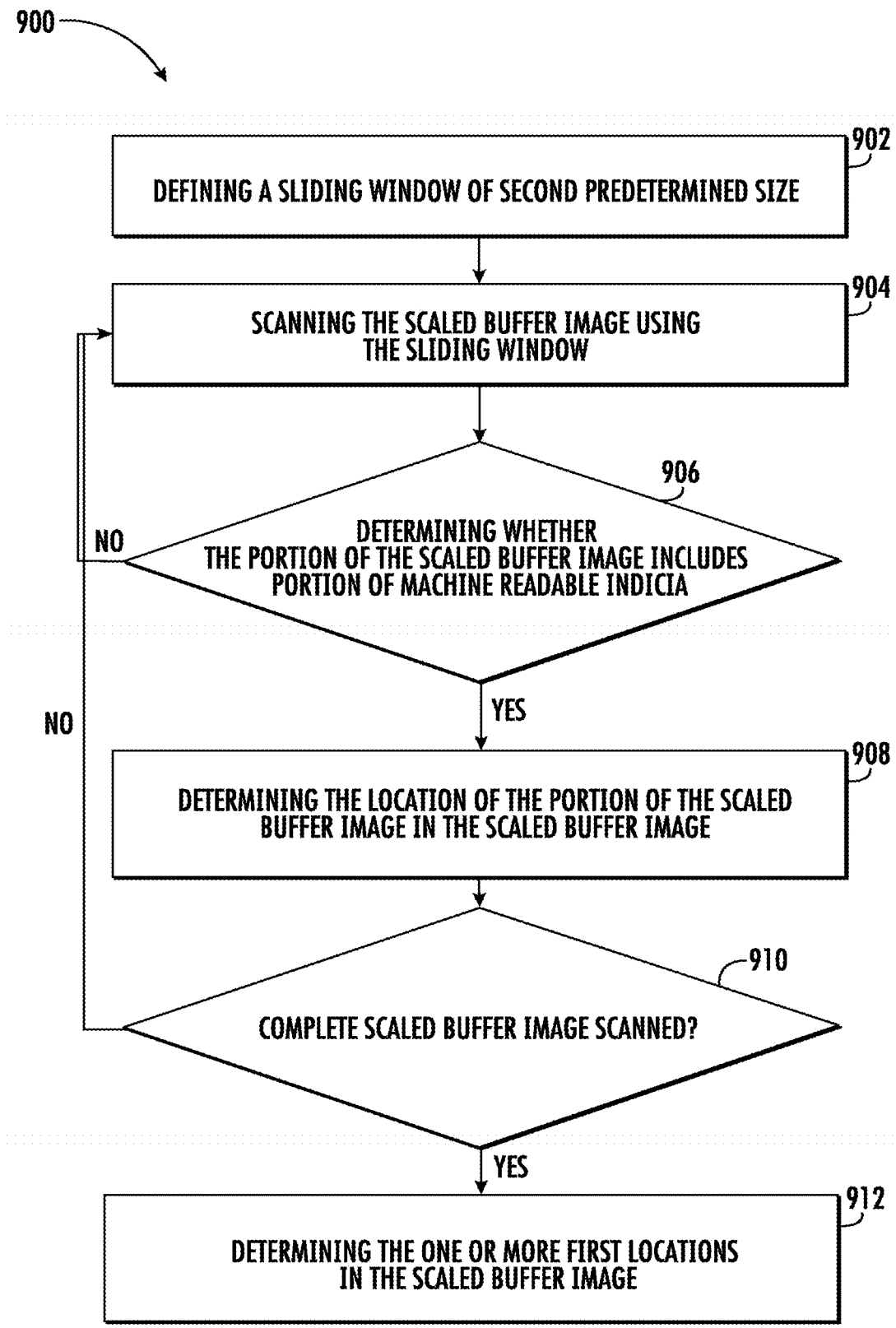
FIG. 9 illustrates another flowchart of a method for identifying ROI in the scaled buffer image, according to one or more embodiments described herein.

FIG. 9 illustrates another flowchart 900 of a method for identifying ROI in the scaled buffer image, according to one or more embodiments described herein.

At step 902, the printing apparatus 106 includes means such as the control unit 108, the first processor 302, the first image processing unit 310, and/or the like for defining a sliding window of second predetermined size. In some examples, the second predetermined size may be stored in the first memory device 304 during the manufacturing of the printing apparatus 106. For example, the first image processing unit 310 may define the sliding window of size 48×48.

At step 904, the printing apparatus 106 includes means such as the control unit 108, the first processor 302, the first image processing unit 310, and/or the like for scanning the scaled buffer image using the sliding window.

At step 906, the printing apparatus 106 includes means such as the control unit 108, the first processor 302, the first image processing unit 310, and/or the like for determining whether the portion of the scaled buffer image, encompassed by the sliding window, includes a portion the machine readable indicia. In an example embodiment, the first image processing unit 310 may utilize a classifier to determine whether the portion of the scaled buffer image includes the portion of the machine readable indicia. In an example embodiment, the classifier may correspond to a mathematical model and/or probabilistic model that is capable of determining whether the portion of the scaled buffer image (encompassed by the sliding window) includes a portion of the machine readable indicia. If the classifier determines that the portion of the scaled buffer image includes the portion of the machine readable indicia, the first image processing unit 310 may be configured to perform the step 908. On the other hand, if the first image processing unit 310 determines that the portion of the scaled buffer image does not include the portion of the machine readable indicia, the first image processing unit 310 may be configured to repeat the step 904.

At step 908, the printing apparatus 106 includes means such as the control unit 108, the first processor 302, the first image processing unit 310, and/or the like for determining the location of the portion of the scaled buffer image in the scaled buffer image. In some examples, determining the location of the portion of the scaled buffer image may include determining the coordinates of the portion of the scaled buffer image. In some examples, the location of the portion of the scaled buffer image may correspond to the coordinates of a center pixel in the portion of the scaled buffer image. In another example, the location of the portion of the scaled buffer image may correspond to the coordinates of a corner pixel in the portion of the scaled buffer image. The first image processing unit 310 may be configured to store the coordinates of the portion of the scaled buffer image in the first memory device 304.

At step 910, the printing apparatus 106 includes means such as the control unit 108, the first processor 302, the first image processing unit 310, and/or the like for determining whether the sliding window has scanned the complete scaled buffer image. If the first image processing unit 310 determines that the sliding window has scanned the complete scaled buffer image, the first image processing unit 310 may be configured to perform the step 912. However, if the first image processing unit 310 determines that the sliding window has not scanned the complete scaled buffer image, the first image processing unit 310 may be configured to repeat the step 904.

At step 912, the printing apparatus 106 includes means such as the control unit 108, the first processor 302, the first image processing unit 310, and/or the like for determining the one or more first locations in the scaled buffer image. As discussed above in the step 908, the first image processing unit 310 may be configured to store the location of the portion of the scaled buffer image (that includes the portion of the machine readable indicia) in the first memory device. Accordingly, the first image processing unit 310 may be configured to retrieve the one or more locations of the one or more portions of the scaled buffer image (that includes the portion of the machine readable indicia) from the first memory device 304. Thereafter, the first image processing unit 310 may utilize the methodology described in the step 806 to determine the one or more first locations in the scaled buffer image. For example, the first image processing unit 310 may be configured to determine the minima and maxima amongst the coordinates of the location of the portions of the scaled buffer image (that includes the portion of the machine readable indicia) to determine the one or more first locations in the scaled buffer image.

Figure 10:
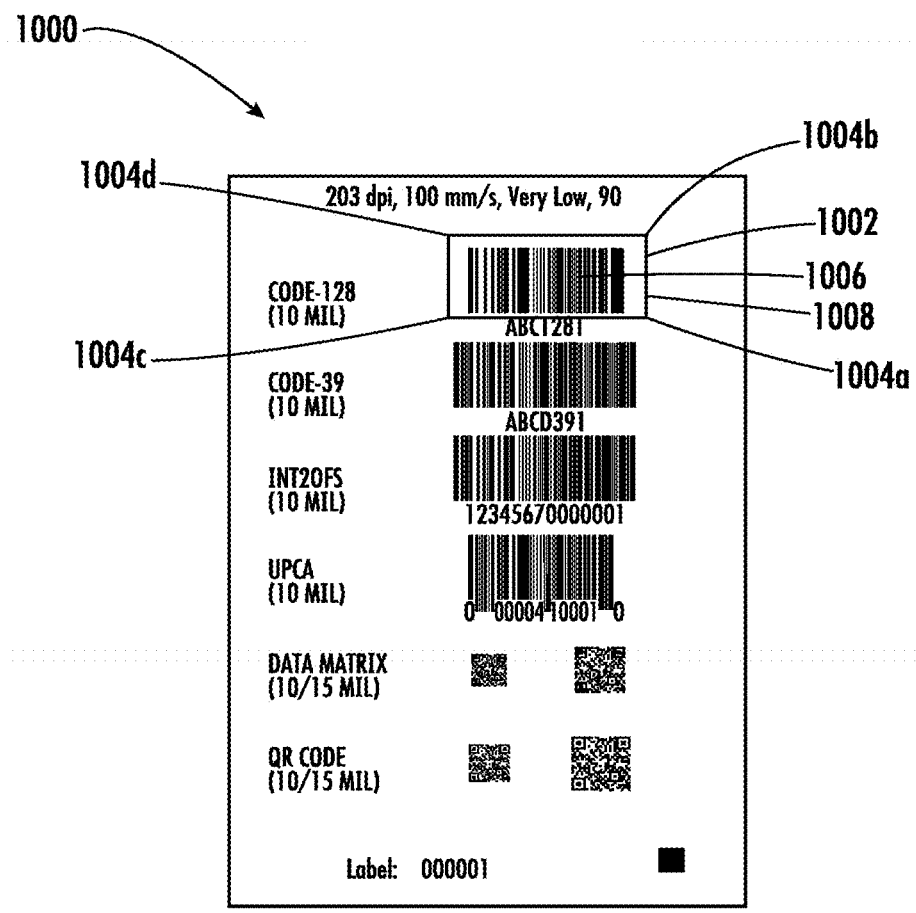
FIG. 10 illustrates an example scaled buffer image comprising the ROI, according to one or more embodiments described herein.

FIG. 10 illustrates an example scaled buffer image 1000 comprising the ROI, according to one or more embodiments described herein.

The first image processing unit 310 identifies the ROI 1002 in the scaled buffer image 1000, as is described in the flowcharts 800 and 900. Further, the first image processing unit 310 identifies the one or more first locations 1004a, 1004b, 1004c, and 1004d that encompass the machine readable indicia 1006. In an example embodiment, following table illustrates the coordinates of the one or more first locations:

TABLE 2

Coordinates of the one or more first locations

| One or more first locations | Coordinates |
| --- | --- |
| Location 1004a | (100, 80) |
| Location 1004b | (140, 80) |
| Location 1004c | (100, 120) |
| Location 1004d | (140, 120) |

Further, as depicted in the example scaled buffer image 1000, a bounding box 1008 connects the one or more first locations 1004a, 1004b, 1004c, and 1004d with each other. Further, as depicted, the bounding box 1008 encompasses the machine readable indicia 1006.

Figure 11:
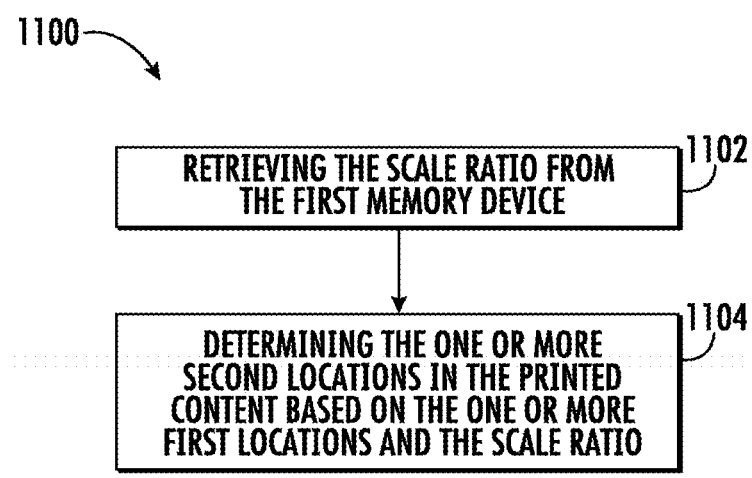
FIG. 11 illustrates a flowchart of a method for translating the one or more first locations to one or more second locations, according to one or more embodiments described herein.

FIG. 11 illustrates a flowchart 1100 of a method for translating the one or more first locations to one or more second locations, according to one or more embodiments described herein.

At step 1102, the printing apparatus 106 includes means such as the control unit 108, the first processor 302, the first image processing unit 310, and/or the like for retrieving the scale ratio from the first memory device 304. As discussed in FIG. 4, the scale ratio is utilized to scale the buffer image. At step 1104, the printing apparatus 106 includes means such as the control unit 108, the first processor 302, the first image processing unit 310, and/or the like for determining the one or more second locations in the printed content based on the one or more first locations and the scale ratio. In an example embodiment, to determine the one or more second locations, the first image processing unit 310 may multiply the scale ratio with the coordinates of the one or more first locations to determine the coordinates of the one or more second locations in the printed content.

In some examples, the scope of the disclosure is not limited to utilizing only the scale ratio to determine the coordinates of the one or more second locations. In some examples, the first image processing unit 310 may consider other additional parameters to determine coordinates of the one or more second locations. For example, the first image processing unit 310 may consider the mechanical parameters associated with the printing apparatus 106 to determine the coordinates of the one or more second locations. Some examples of the mechanical parameters may include, but are not limited to, a distance of a left edge of the label and a left edge of the printed content, a distance between right edge of the label and a right edge of the printed content, a tolerance of gear free play and/or the like. In an example embodiment, the left edge of the printed content may be composed of a left pixel that is proximal to the left edge of the label and is distal from the right edge of the label. Further, there is an empty space (i.e., is no printed content) between the left pixel and the left edge of the label. Similarly, in an example embodiment, the right edge of the printed content may be composed of a right pixel that is proximal to the right edge of the label and is distal from the left edge of the label. Further, there is an empty space (i.e., is no printed content) between the right pixel and the right edge of the label. In some examples, the gear free play may correspond to a distance by which the gear rotates without applying force on other components of the printing apparatus 106.

Figure 12:
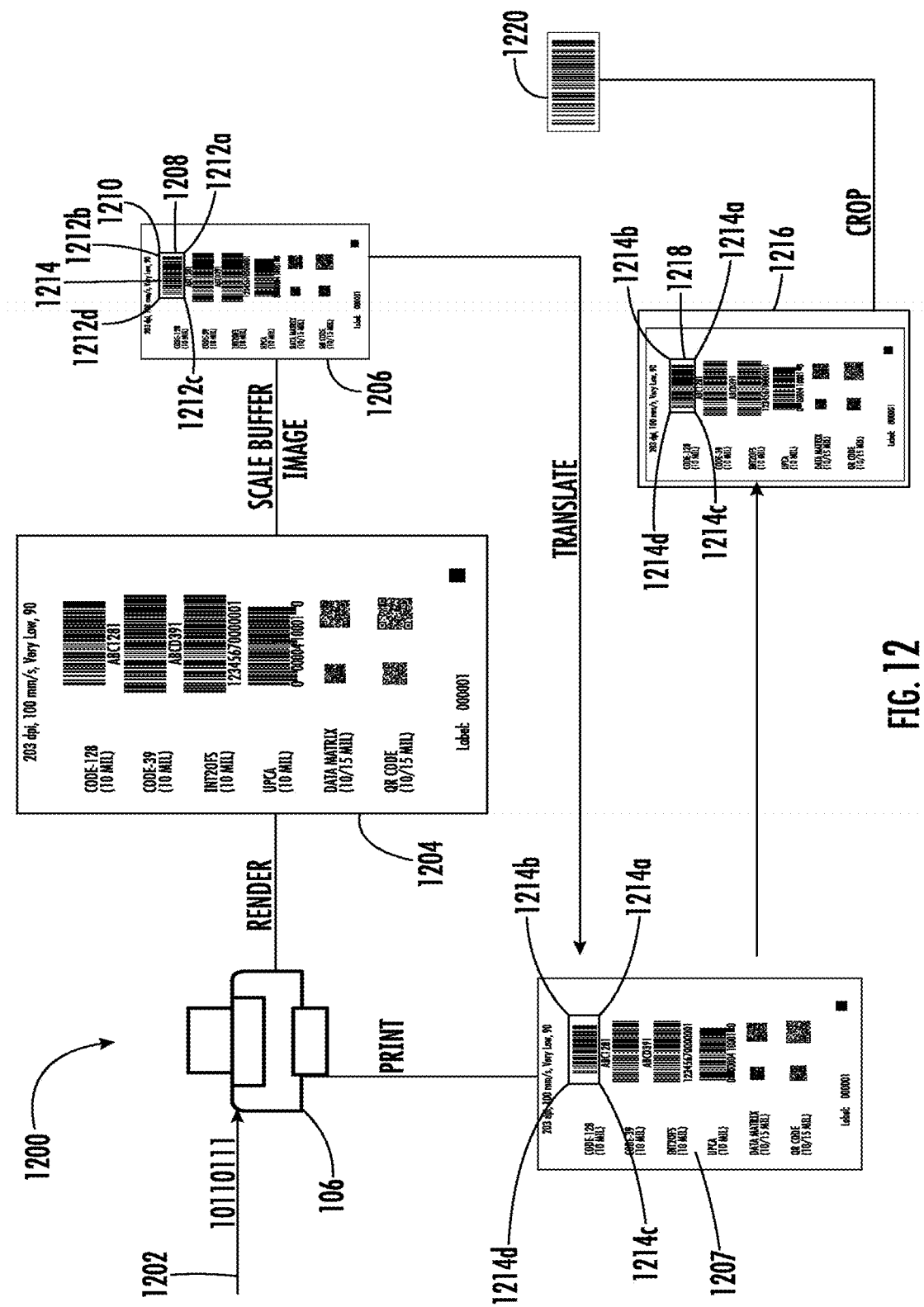
FIG. 12 illustrates an example scenario of verifying the printed content, according to one or more embodiments described herein.

FIG. 12 illustrates an example scenario 1200 of verifying the printed content, according to one or more embodiments described herein.

The example scenario 1200 depicts that printing apparatus 106 receives the bit stream 1202 from the user computing device 102, as is described in step 402. In some examples, the first image processing unit 310 may convert the bit stream 1202 into the buffer image 1204, as is described in the step 404. For example, the buffer image (created from the bit stream 1202) has a resolution of the 1024 by 968. Thereafter, the first image processing unit 310 (in the printing apparatus 106) may be configured to scale the buffer image to generate the scaled buffer image 1206. For example, the first image processing unit 310 may reduce the resolution of the buffer image 1204 based on the scale ratio. In some examples, if the scale ratio is 4:1, the scaled buffer image 1206 has a resolution 512×484. Concurrently, the printing apparatus 106 may print the buffer image on the print media 214 to generate the printed content 1207, as is described in the step 406. Further, the printer apparatus may cause the traversal of the print media 214 along the print direction, as is described in flowchart 400. Such operation causes traversal of the printed content 1207 from the print head 210 to the verifier 211.

Concurrently, in an example embodiment, the first image processing unit 310 may be configured to identify the ROI 1208 in the scaled buffer image 1206 as is described in the step 412. For example, the first image processing unit 310 may identify the machine readable indicia 1210 as the ROI 1208. Further, the first image processing unit 310 identifies the one or more first locations 1212a, 1212b, 1212c, and 1212d in the scaled buffer image 1206 such that the virtual bounding box 1214 (connecting the one or more first locations 1212a, 1212b, 1212c, and 1212d) encompasses the machine readable indicia 1210. Additionally, the first image processing unit 310 may determine the coordinates of the one or more first locations 1212a, 1212b, 1212c, and 1212d. For instance, the first image processing unit 310 determines the coordinates of the one or more first locations 1212a, 1212b, 1212c, and 1212d, as depicted in the table 2. Thereafter, the first image processing unit 310 may be configured to determine the one or more second locations 1214a, 1214b, 1214c, and 1214d on the printed content 1207 (that corresponds to the ROI 1208 in the printed content 1207). In some examples, the first image processing unit 310 may multiply the scale ratio with the coordinates of the one or more first locations 1212a, 1212b, 1212c, and 1212d to determine the coordinates of the one or more second locations 1114a, 1214b, 1214c, and 1214d. For instance, the following table illustrates the coordinates of the one or more second locations 1214a, 1214b, 1214c, and 1214d:

TABLE 3

Coordinates of the one or more second locations

| One or more second locations | Coordinates |
| --- | --- |
| Second Location 1214a | (400, 320) |
| Second Location 1214b | (560, 320) |
| Second Location 1214c | (400, 480) |
| Second Location 1214d | (560, 480) |

In some examples, the verifier control unit 312 may cause the verifier 211 may scan the printed content 1207. The verifier 211 may generate the second image 1216 of printed content 1207 based on the scanning of the printed content 1207. The second image 1216 is the digital representation of the printed content 1207. Accordingly, the one or more second locations 1214a, 1214b, 1214c, and 1214d in the second image may encompass the ROI 1208 in the second image 1216. For example, the bounding box 1218, connecting the one or more second locations 1214a, 1214b, 1214c, and 1214d, encompasses the ROI 1208 in the second image 1216. Thereafter, the first image processing unit 310 retrieves or crops the ROI 1208 from the second image 1216 to generate the portion of the second image 1220. The portion of the second image includes the digital representation of the printed machine readable indicia 1210. In some examples, the first image processing unit 310 may grade the digital representation of the machine readable indicia 1210, as is described in the step 422.

In some examples, the scope of the disclosure is not limited to the printing apparatus 106 performing the operations, as is described in the flowchart 400. In an example embodiment, certain steps of the flowchart 400 may be performed by the user computing device 102, as is further described in the FIGS. 13 and 14.

Figure 13:
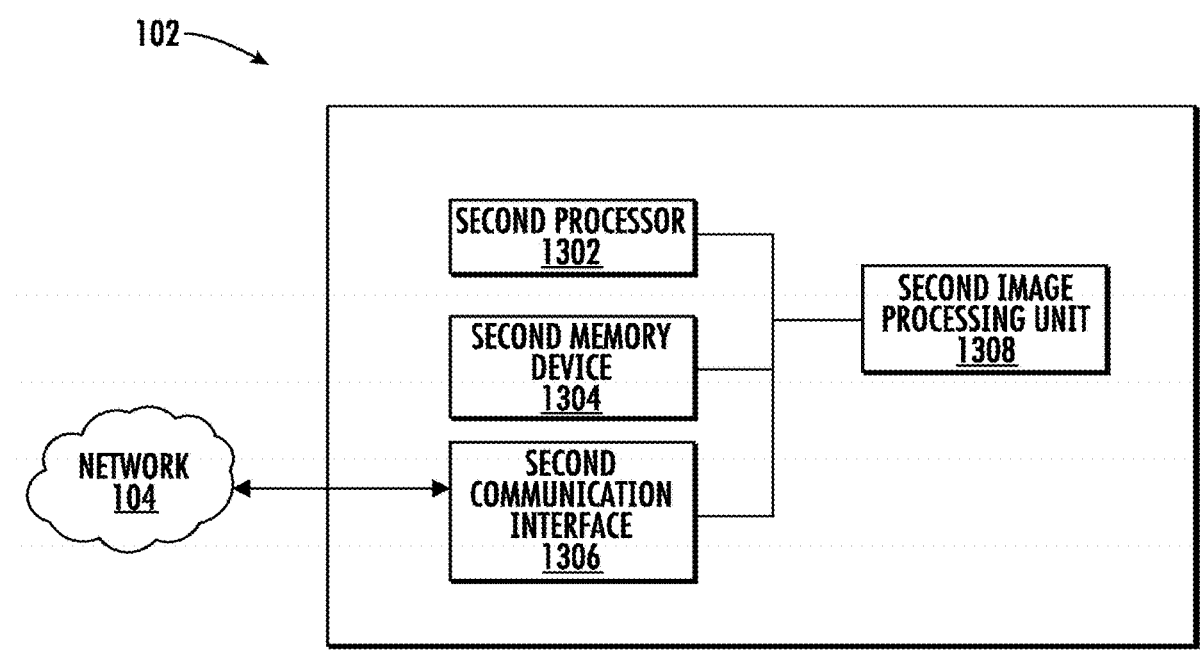
FIG. 13 illustrates a block diagram of the user computing device, according to one or more embodiments described herein.

FIG. 13 illustrates a block diagram of the user computing device 102, according to one or more embodiments described herein. In an example embodiment, the user computing device 102 includes a second processor 1302, a second memory device 1304, a second communication interface 1306, and a second image processing unit 1308.

The second processor 1302 may be embodied as a means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 13 as a single processor, in an embodiment, the second processor 1302 may include a plurality of processors and signal processing modules. The plurality of processors may be embodied on a single electronic device or may be distributed across a plurality of electronic devices collectively configured to function as the circuitry of the user computing device 102. The plurality of processors may be in operative communication with each other and may be collectively configured to perform one or more functionalities of the circuitry of the user computing device 102, as described herein. In an example embodiment, the second processor 1302 may be configured to execute instructions stored in the second memory device 1304 or otherwise accessible to the second processor 1302. These instructions, when executed by the second processor 1302, may cause the circuitry of the control system 120 to perform one or more of the functionalities, as described herein.

Whether configured by hardware, firmware/software methods, or by a combination thereof, the second processor 1302 may include an entity capable of performing operations according to embodiments of the present disclosure while configured accordingly. Thus, for example, when the second processor 1302 is embodied as an ASIC, FPGA or the like, the second processor 1302 may include specifically configured hardware for conducting one or more operations described herein. Alternatively, as another example, when the second processor 1302 is embodied as an executor of instructions, such as may be stored in the second memory device 1304, the instructions may specifically configure the second processor 1302 to perform one or more algorithms and operations described herein.

Thus, the second processor 1302 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The second memory device 1304 may include suitable logic, circuitry, and/or interfaces that are adapted to store a set of instructions that is executable by the second processor 1302 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an embodiment, the second memory device 1304 may be integrated with the second processor 1302 on a single chip, without departing from the scope of the disclosure.

The second communication interface 1306 may correspond to a communication interface that may facilitate transmission and reception of messages and data to and from various devices operating in the system environment 100 through the network 104. For example, the second communication interface 1306 is communicatively coupled with the printing apparatus 106 through the network 104. In some examples, through the second communication interface 1306, the user computing device 102 may transmit first image data. The first image data may include a bit stream that may be representative of the first image to be printed on the print media 214. Examples of the second communication interface 1306 may include, but are not limited to, an antenna, an Ethernet port, a USB port, a serial port, or any other port that can be adapted to receive and transmit data. The second communication interface 1306 transmits and receives data and/or messages in accordance with the various communication protocols, such as, I2C, TCP/IP, UDP, and 2G, 3G, or 4G communication protocols.

Figure 14:
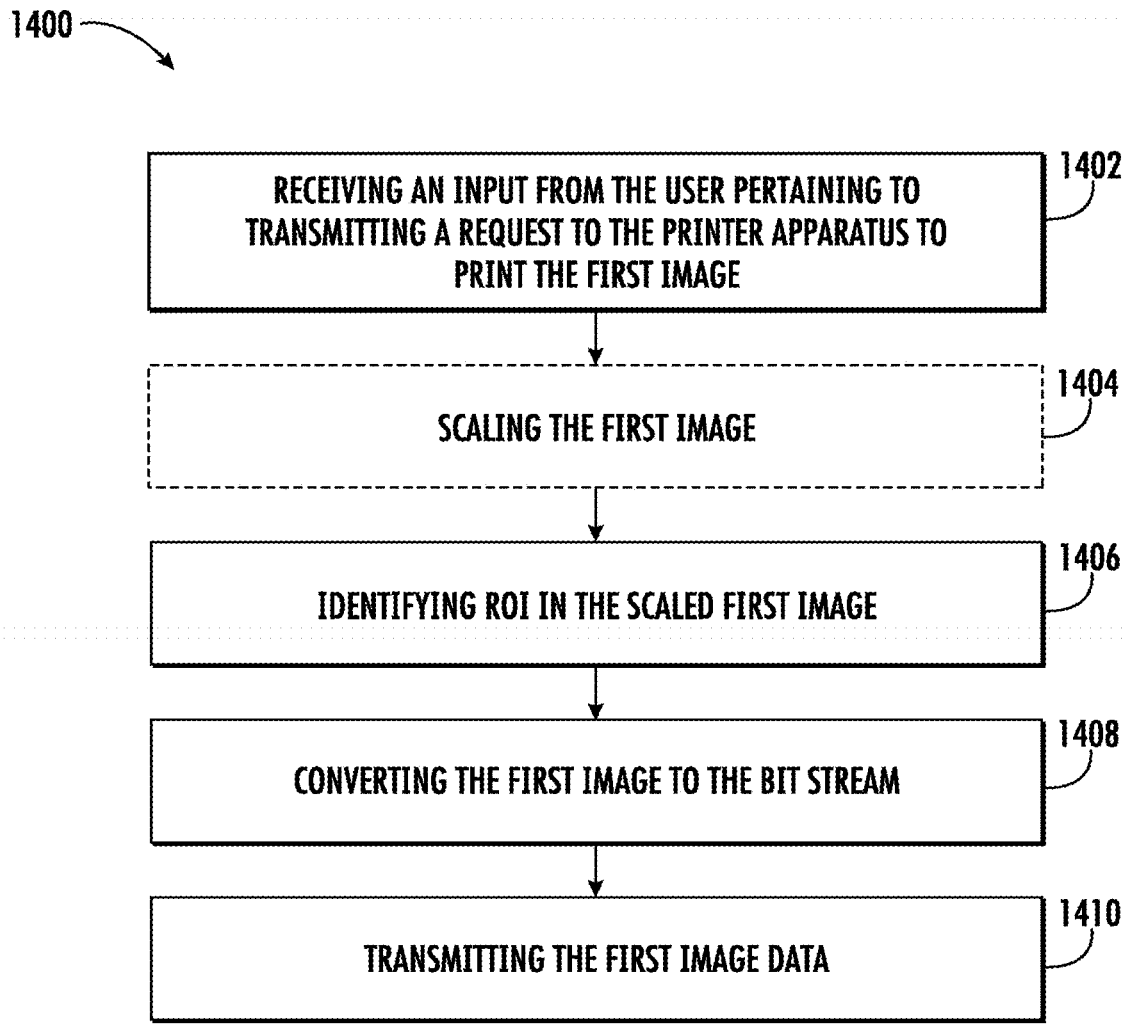
FIG. 14 illustrates a flowchart of a method for operating the user computing device, according to one or more embodiments described herein.

The second image processing unit 1308 may include suitable logic and/or circuitry that may enable the second image processing unit 1308 to identify ROI in the first image, as is further described in conjunction with FIG. 14. The second image processing unit 1308 may be have a similar structure to that of the first image processing unit 310. Further, the embodiments applicable on the first image processing unit 310 are also applicable on the second image processing unit 1308.

FIG. 14 illustrates a flowchart 1400 of a method for operating the user computing device 102, according to one or more embodiments described herein.

At step 1402, the user computing device 102 may include means, such as the second processor 1302, the second image processing unit 1308, and/or the like, for receiving an input from the user pertaining to transmitting a request to the printer apparatus to print the first image.

At step 1404, the user computing device 102 may include means, such as the second processor 1302, the second image processing unit 1308, and/or the like, for scaling the first image. In an example embodiment, the second image processing unit 1308 may utilize methodologies described in the step 410 to perform the step 1404. For example, the second image processing unit 1308 may be configured to scale the first image based on the scale ratio.

In some examples, the step 1404 may be optional and the second image processing unit 1308 may be configured to identify the ROI in the first image, without departing from the scope of the disclosure.

At step 1406, the user computing device 102 may include means, such as the second processor 1302, the second image processing unit 1308, and/or the like, for identifying ROI in the scaled first image. In an example embodiment, the second image processing unit 1308 may utilize methodologies described in FIG. 8, FIG. 9 and FIG. 10 to identify the ROI in the scaled first image. For example, the second image processing unit 1308 may be configured to determine one or more fourth locations in the first image, where a bounding box connecting the one or more fourth locations in the first image encompasses the ROI. As discussed, determining the one or more fourth locations involves determining the coordinates of the one or more fourth locations in the scaled first image.

At step 1408, the user computing device 102 may include means, such as the second processor 1302, the second image processing unit 1308, and/or the like, for converting the first image to the bit stream. In an example embodiment, the bit stream corresponds to the first image data. Thereafter, at step 1410, the user computing device 102 may include means, such as the second processor 1302, the second communication interface 1306, and/or the like, for transmitting the first image data. Additionally or alternatively, the second processor 1302 may transmit the coordinates of the one or more fourth locations and the scale ratio. In some examples, the second communication interface 1306 may be configured to transmit the first image data, the scale ratio, and the one or more third locations as the fifth instruction. The operation performed by the printing apparatus 106 upon reception of the fifth instruction is further described in conjunction with FIG. 15.

Figure 15:
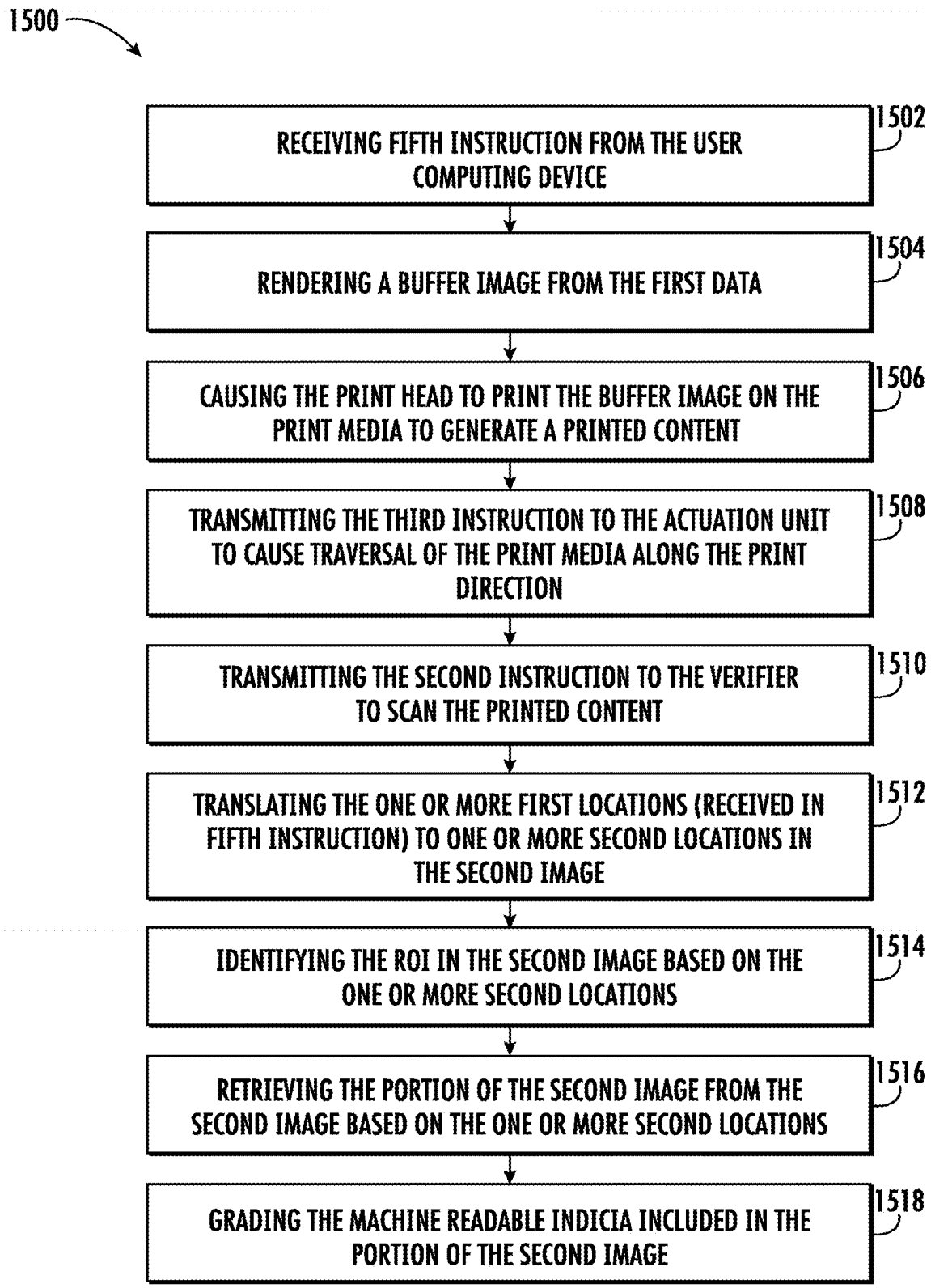
FIG. 15 illustrates a flowchart of another method for operating the printing apparatus, according to one or more embodiments described herein.

FIG. 15 illustrates a flowchart 1500 of another method for operating the printing apparatus 106, according to one or more embodiments described herein.

At step 1502, the printing apparatus 106 may include means, such as the control unit 108, the first processor 302, the first communication interface 306, and/or the like, for receiving the fifth instruction from the user computing device 102. As discussed, the fifth instruction includes the first image data, the scale ratio, and the coordinates of the one or more fourth locations. At step 1504, the printing apparatus 106 may include means, such as the control unit 108, the first processor 302, the first image processing unit 310, and/or the like, for rendering a buffer image from the first image data (i.e., the bit stream).

At step 1506, the printing apparatus 106 may include means, such as the control unit 108, the first processor 302, the first image processing unit 310, and/or the like, for causing the print head 210 to print the buffer image on the print media 214 to generate a printed content. At step 1508, the printing apparatus 106 may include means, such as the control unit 108, the first processor 302, the I/O device interface unit 308, and/or the like, for transmitting the third instruction to the actuation unit to cause traversal of the print media 214 along the print direction. Upon receiving the third instruction, the actuation unit 219 causes the print media 214 to traverse along the print direction. Accordingly, the printed content traverse from the print head 210 to the verifier 211.

At step 1510, the printing apparatus 106 may include means, such as the control unit 108, the first processor 302, the verifier control unit 312, the I/O device interface unit 308, and/or the like, for transmitting the second instruction to the verifier 211 to scan the printed content. the verifier 211 may generate the second image based on the scanning of the printed content.

At step 1512, the printing apparatus 106 may include means, such as the control unit 108, the first processor 302, the first image processing unit 310, and/or the like, for translating the one or more first locations (received in fifth instruction) to one or more second locations in the second image. In an example embodiment, the first image processing unit 310 may use the scale ratio to determine the one or more second locations in the second image.

At step 1514, the printing apparatus 106 may include means, such as the control unit 108, the first processor 302, the first image processing unit 310, and/or the like, for identifying the ROI in the second image based on the one or more second locations.

At step 1516, the printing apparatus 106 may include means, such as the control unit 108, the first processor 302, the first image processing unit 310, and/or the like, for retrieving the portion of the second image from the second image based on the one or more second locations.

At step 1518, the printing apparatus 106 may include means, such as the control unit 108, the first processor 302, the first image processing unit 310, and/or the like, for grading the machine readable indicia included in the portion of the second image.

In the specification and figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing detailed description has set forth various embodiments of the devices and/or processes via the use of block diagrams, flow charts, schematics, exemplary, and examples. Insofar as such block diagrams, flow charts, schematics, and examples contain one or more functions and/or operations, each function and/or operation within such block diagrams, flowcharts, schematics, or examples can be implemented, individually and/or collectively, by a wide range of hardware thereof.

In one embodiment, examples of the present disclosure may be implemented via Application Specific Integrated Circuits (ASICs). However, the embodiments disclosed herein, in whole or in part, can be equivalently implemented in standard integrated circuits, as one or more computer programs running on one or more computers (e.g., as one or more programs running on one or more computer systems), as one or more programs running on one or more processing circuitries (e.g., micro-processing circuitries), as one or more programs running on one or more processors (e.g., microprocessors), as firmware, or as virtually any combination thereof.

In addition, those skilled in the art will appreciate that example mechanisms disclosed herein may be capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, digital tape, flash drives, and computer memory.

The various embodiments described above can be combined with one another to provide further embodiments. For example, two or more of example embodiments described above may be combined to, for example, improve the safety of laser printing and reduce the risks associated with laser-related accidents and injuries. These and other changes may be made to the present systems and methods in light of the above detailed description. Accordingly, the disclosure is not limited by the disclosure, but instead its scope is to be determined by the following claims.

What is claimed is:

1. A user computing device communicatively coupled with a printing apparatus, comprises:
a processor, wherein the processor is configured to:
receive an input from a user pertaining to print an image;
determine a location of a machine readable indicia in the image;
convert the image to a bit stream; and
transmit an instruction to the printing apparatus to print on a print media to generate a printed content, wherein the instruction comprises the bit stream and the location of the machine readable indicia,
wherein the location of the machine readable indicia facilitate the printing apparatus for identification of a region of interest in a captured image of the printed content.

2. The user computing device of claim 1, wherein the processor is further configured to determine one or more locations in the image that include a portion of the machine readable indicia and wherein a bounding box connecting the one or more locations that include a portion of the machine readable indicia in the image encompasses the region of interest.

3. The user computing device of claim 2, wherein the processor is further configured to determine one or more locations in the image that include a portion of the machine readable indicia by determining coordinates of the one or more locations in the image that include a portion of the machine readable indicia.

4. The user computing device of claim 3, wherein the instruction further comprises the bit stream and coordinates of the one or more locations that include a portion of the machine readable indicia.

5. The user computing device of claim 4, wherein the processor is further configured to render a buffer image from the bit stream.

6. The user computing device of claim 5, wherein the bit stream comprises the region of interest.

7. The user computing device of claim 6, wherein the region of interest comprises at least one of an address field, a text content, a graphic content, or the machine readable indicia.

8. The user computing device of claim 4, wherein the bit stream is representative of the image to be printed on the print media.

9. The user computing device of claim 8, wherein the bit stream is representative of the image either in a monotone format, a continuous tone format or in a half tone format.

10. The user computing device of claim 9, wherein the bit stream is a compressed form of the image.

11. The user computing device of claim 10, wherein the portion of the printed content includes the machine readable indicia.

12. A method for operating a user computing device communicatively coupled with a printing apparatus, the method comprising:
receiving, by one or more processors, an input from a user pertaining to print an image;
determining, by the one or more processors, a location of a machine readable indicia in the image;
converting, by the one or more processors, the image to a bit stream; and
transmitting, by the one or more processors, an instruction to the printing apparatus to print on a print media to generate a printed content, wherein the instruction comprises the bit stream and the location of the machine readable indicia,
wherein the location of the machine readable indicia facilitate the printing apparatus for identification of a region of interest in a captured image of the printed content.

13. The method of claim 12, further comprising determining, by the one or more processors, one or more locations in the image that include a portion of the machine readable indicia and wherein a bounding box connecting the one or more locations that include a portion of the machine readable indicia in the image encompasses the region of interest.

14. The method of claim 13, further comprising determining, by the one or more processors, one or more locations in the image that include a portion of the machine readable indicia by determining coordinates of the one or more locations in the image that include a portion of the machine readable indicia.

15. The method of claim 14, wherein the instruction further comprises the bit stream and coordinates of the one or more locations that include a portion of the machine readable indicia.

16. The method of claim 15, further comprising rendering, by the one or more processors, a buffer image from the bit stream.

17. The method of claim 16 wherein the bit stream comprises the region of interest.

18. The method of claim 17, wherein the region of interest comprises at least one of an address field, a text content, a graphic content, or the machine readable indicia.

19. The method of claim 15, wherein the bit stream is representative of the image to be printed on the print media.

20. The method of claim 19, wherein the bit stream is representative of the image either in a monotone format, a continuous tone format or in a half tone format.

* * * * *